United States Patent
Nagata et al.

(10) Patent No.: US 10,854,080 B2
(45) Date of Patent: Dec. 1, 2020

(54) VEHICLE CONTROL SYSTEM

(71) Applicant: TOYOTA JIDOSHA KABUSHIKI KAISHA, Toyota (JP)

(72) Inventors: Shinichi Nagata, Ebina (JP); Minami Sato, Ebina (JP); Miyuki Kamatani, Susono (JP); Akitoshi Minemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 16/040,068

(22) Filed: Jul. 19, 2018

(65) Prior Publication Data

US 2019/0088136 A1 Mar. 21, 2019

(30) Foreign Application Priority Data

Sep. 19, 2017 (JP) ................................. 2017-178885

(51) Int. Cl.
*G08G 1/16* (2006.01)

(52) U.S. Cl.
CPC ............. *G08G 1/166* (2013.01); *G08G 1/163* (2013.01); *G08G 1/164* (2013.01); *G08G 1/167* (2013.01); *B60W 2554/00* (2020.02)

(58) Field of Classification Search
CPC ........ G08G 1/166; G08G 1/163; G08G 1/164; G08G 1/167; B60W 2554/00
See application file for complete search history.

(56) References Cited

U.S. PATENT DOCUMENTS

| 2014/0324330 | A1 | 10/2014 | Minemura et al. |
| 2015/0232073 | A1 | 8/2015 | Fujishiro |
| 2017/0183003 | A1* | 6/2017 | Ohmura ................ B60W 10/04 |
| 2017/0217432 | A1* | 8/2017 | Minemura ........... G05D 1/0246 |

FOREIGN PATENT DOCUMENTS

| JP | 5172366 B2 | 3/2013 |
| JP | 2014-213776 A | 11/2014 |
| JP | 2016-35634 A | 3/2016 |
| WO | 2014/037998 A1 | 3/2014 |

* cited by examiner

*Primary Examiner* — Aaron L Troost
(74) *Attorney, Agent, or Firm* — Sughrue Mion, PLLC

(57) ABSTRACT

A vehicle control system includes an electronic control unit configured to: recognize at least one object; determine a risk of the at least one object entering a course of the host vehicle; and perform, when the at least one object enters a target area set in front of the host vehicle with respect to the host vehicle, driving support. The electronic control unit is configured to determine whether the risk is high or low based on a relative relationship between two or more objects, and the electronic control unit is configured to set the target area to be larger when it is determined that the risk is high than when it is determined that the risk is low.

13 Claims, 15 Drawing Sheets

VEHICLE CONTROL SYSTEM

INCORPORATION BY REFERENCE

The disclosure of Japanese Patent Application No. 2017-178885 filed on Sep. 19, 2017 including the specification, drawings and abstract is incorporated herein by reference in its entirety.

BACKGROUND

1. Technical Field

The disclosure relates to a vehicle control system.

2. Description of Related Art

Japanese Patent No. 5172366 discloses a technique of predicting a course of a moving object which is moving in front of a host vehicle and adaptively avoiding collision of the host vehicle with the moving object. Specifically, in this technique, a stationary object and a moving object on a sidewalk adjacent to a traveling lane of a host vehicle are detected using a camera. Then, a variation in distance between the stationary object and the moving object is calculated by analysis of a captured image, and a time at which the moving object is predicted to enter the traveling lane for the purpose of avoidance of the stationary object is calculated based on a relative speed of the moving object with respect to the stationary object. A time at which the host vehicle will pass by the stationary object is calculated based on a distance between the host vehicle and the stationary object. When two times which are calculated in this way are the same, it is determined that there is a likelihood that the host vehicle will collide with the moving object and a driver is notified of the likelihood of this by speech or the like.

SUMMARY

The above-mentioned technique is based on the premise that the moving object enters the course of the host vehicle to avoid the stationary object because the stationary object is located in the course of the moving object. However, there is a likelihood that the moving object may pass by on the opposite side to the traveling lane with respect to the stationary object depending on a relative relationship between the moving object and the stationary object. That is, a risk that an object moving in front of a host vehicle will enter a course of the host vehicle depends on a relative relationship between objects. The relative relationship mentioned herein includes a direction, a distance, a relative speed, and a relative position. In the above-mentioned technique, determination of a level of a risk based on the relative relationship between objects is not performed.

When certain driving support such as intervention in a driving operation is performed for collision avoidance, it is preferable that a level of a risk that an object will enter a course of a host vehicle be determined and the determination result be reflected in details of driving support. When a risk is low but driving support is performed, there is a likelihood that a driver will feel discomfort in unnecessary intervention in a driving operation. On the other hand, when a risk is high but driving support is not performed, there is a likelihood that collision will not be avoided.

The disclosure provides a vehicle control system that can increase reliability of avoiding collision of a host vehicle with an object which enters a course of the host vehicle while curbing unnecessary intervention in a driving operation.

An aspect of the disclosure provides a vehicle control system including an electronic control unit configured to: recognize at least one object in front of a host vehicle using a sensor; determine a risk of the at least one object entering a course of the host vehicle; and perform, when the at least one object enters a target area set in front of the host vehicle with respect to the host vehicle, driving support for decreasing a likelihood of collision of the host vehicle with the at least one object, wherein the electronic control unit is configured to determine whether the risk is high or low based on a relative relationship between two or more objects when the at least one object includes the two or more objects, and set the target area to be larger when it is determined that the risk is high than when it is determined that the risk is low.

When there are two or more objects in front of the host vehicle, the risk that each object will enter the course of the host vehicle depends on the relative relationship between the objects. As for an object with a high risk, an operation probability of driving support can be increased or a time point at which the driving support operates can be advanced so that reliability of avoidance of collision with the object can be increased. On the other hand, as for an object with a low risk, an operation probability of driving support can be relatively decreased or a time point at which the driving support operates can be delayed so that unnecessary intervention in a driving operation can be curbed. Regarding this point, with the vehicle control system having the above-mentioned configuration, it is possible to increase an operation probability of driving support or to advance a time point at which driving support operates by relatively enlarging the target area for an object for which the risk is determined to be high. It is possible to decrease an operation probability of driving support or to relatively delay a time point at which driving support operates by relatively reducing the target area for an object for which the risk is determined to be low.

In the aspect, the electronic control unit may be configured to enlarge the target area, in at least a width direction of the host vehicle, to be larger when it is determined that the risk is high than when it is determined that the risk is low.

According to the above configuration, it is possible to increase an operation probability of driving support for an object of which the risk is determined to be high and to enhance reliability of avoidance of collision with the object.

In the aspect, the electronic control unit may be configured to set a control value for the driving support to be larger when it is determined that the risk is high than when it is determined that the risk is low.

According to the above configuration, it is possible to further enhance reliability of avoidance of collision with an object for which the risk is determined to be high and to further curb unnecessary intervention in a driving operation for an object for which the risk is determined to be low.

In the aspect, the electronic control unit may be configured to determine the risk only when the at least one object includes at least one moving object.

Only a moving object has a likelihood of entrance into the course of the host vehicle. According to the above configuration, it is possible to decrease a calculation load on the vehicle control system by not performing determination of the risk when the recognized object does not include a moving object.

In the aspect, the electronic control unit may be configured to determine the risk only for the at least one moving object.

According to the above configuration, it is possible to further decrease the calculation load on the vehicle controller by limiting a target for which the risk will be determined to a moving object.

In the aspect, the electronic control unit may be configured to determine whether the risk is high or low for a moving object with respect to a stationary object when the at least one object includes the moving object and the stationary object.

The moving object enters the course of the host vehicle to avoid the stationary object. Accordingly, it is possible to perform determination with high accuracy by performing determination of the risk with respect to the stationary object.

In the aspect, the electronic control unit may be configured to acquire a comparison result by performing at least one of (i) comparison between a current position of the moving object in a road width direction relative to the stationary object and a first threshold range, (ii) comparison between a future position of the moving object in the road width direction when the moving object is level with the stationary object in a vehicle traveling direction of the host vehicle and a second threshold range, (iii) comparison between a time until the moving object is level with the stationary object in the vehicle traveling direction and a third threshold range, and (iv) comparison between a distance of the moving object from the stationary object in the vehicle traveling direction and a fourth threshold range; and determine whether the risk is high or low based on the comparison result.

By performing a plurality of comparisons and combining the comparison results thereof, it is possible to perform determination of the risk with higher accuracy.

In the aspect, the electronic control unit may be configured to set the first threshold range to be on the same side as the host vehicle with respect to the stationary object.

This is because the risk that the moving object will enter the course of the host vehicle is higher when the moving object is located on the same side as the host vehicle with respect to the stationary object than when the moving object is located on the side opposite to the host vehicle with respect to the stationary object.

In the aspect, the electronic control unit may be configured to set the second threshold range to be on the same side as the host vehicle with respect to the stationary object.

In the aspect, the electronic control unit may be configured to determine that, when there are a plurality of moving objects for which the risk is determined to be high based on the comparison result, a first risk for a first moving object is higher than a second risk for a second moving object, in a case where the first moving object is located closer to the host vehicle compared with the second moving object in a width direction of the host vehicle, the plurality of the moving objects including the first moving object and the second moving object.

In the aspect, the electronic control unit may be configured to determine that, when there are a plurality of moving objects for which the risk is determined to be high based on the comparison result, a first risk for a first moving object is higher than a second risk for a second moving object, in a case where a first future position of the first moving object in the road width direction when the first moving object is level with the stationary object in the vehicle traveling direction is closer to the host vehicle compared with a second future position of the second moving object in the road width direction when the second moving object is level with the stationary object in the vehicle traveling direction, the plurality of the moving objects including the first moving object and the second moving object.

In the aspect, the electronic control unit may be configured to determine that, when there are a plurality of moving objects for which the risk is determined to be high based on the comparison result, a first risk for a first moving object is higher than a second risk for a second moving object, in a case where a first time until the first moving object is level with the host vehicle in the vehicle traveling direction is shorter than a second time until the second moving object is level with the host vehicle in the vehicle traveling direction, the plurality of the moving objects including the first moving object and the second moving object.

In the aspect, the electronic control unit may be configured to determine that, when there are a plurality of moving objects for which the risk is determined to be high based on the comparison result, a first risk for a first moving object is higher than a second risk for a second moving object, in a case where a first distance between the first moving object and the host vehicle in the vehicle traveling direction is smaller than a second distance between the second moving object and the host vehicle in the vehicle traveling direction, the plurality of the moving objects including the first moving object and the second moving object.

In the aspect, the electronic control unit may be configured to determine that, when there are a plurality of moving objects for which the risk is determined to be high based on the comparison result, a first risk for a first moving object, the first moving object being located inside a road edge line, is higher than a second risk for a second moving object, the second moving object being located outside the road edge line, the plurality of the moving objects including the first moving object and the second moving object.

In the aspect, the electronic control unit may be configured to enlarge the target area, in the vehicle traveling direction, to be larger when it is determined that the risk is high than when it is determined that the risk is low.

As described above, with the vehicle control system according to the disclosure, it is possible to increase reliability of avoiding collision of a host vehicle with an object which enters a course of the host vehicle while curbing unnecessary intervention in a driving operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. When a numerical value such as the number of elements, a volume, an amount, and a range is mentioned in the following embodiments, the disclosure is not limited by the mentioned numerical value except when mentioned explicitly or when apparently limited to the numerical value in principle. Structures which will be described in the following embodiments are not essential to the disclosure except when this is mentioned explicitly such as when it is clearly specified or obvious in principle.

First Embodiment 1-1. Configuration of Vehicle Controller

Figure 1:
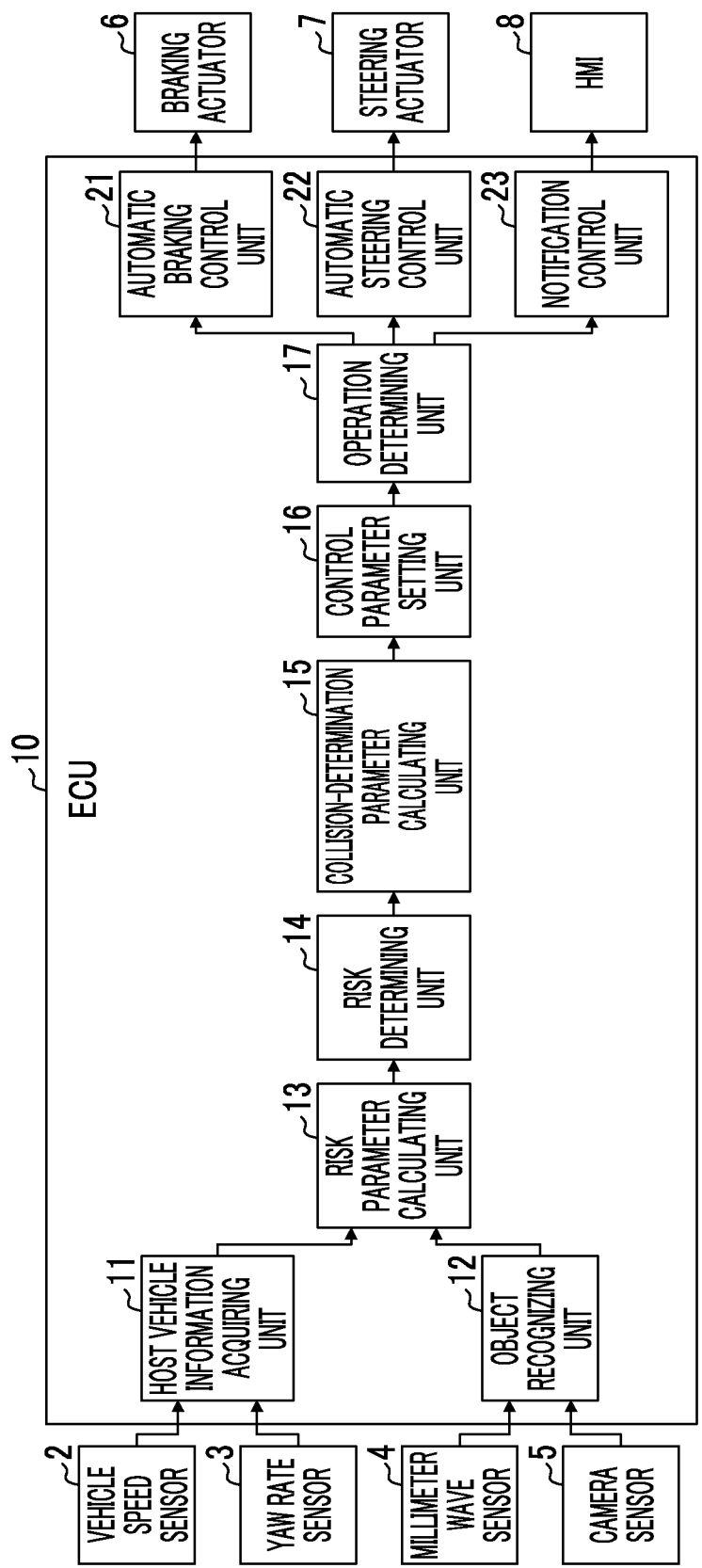
FIG. 1 is a block diagram illustrating a configuration of a vehicle controller according to an embodiment of the disclosure.

A vehicle controller according to an embodiment of the disclosure is a device that detects a likelihood of collision of a host vehicle in which the vehicle controller is mounted and supports driving of a vehicle by a driver for avoidance of the collision. FIG. 1 is a block diagram illustrating a configuration of the vehicle controller according to the embodiment of the disclosure. The configuration of the vehicle controller which will be described below is common to a second embodiment, a third embodiment, and a fourth embodiment which will be described later as well as the first embodiment.

As illustrated in FIG. 1, a vehicle controller 10 is configured to receive signals from various sensors 2, 3, 4, and 5 attached to the vehicle and to operate various actuators 6 and 7 or a human-machine interface (HMI) 8 in accordance with operation signals which are acquired by processing the received signals. The sensors 2, 3, 4, and 5 include sensors 2 and 3 that acquire information on a movement state of the vehicle and sensors 4 and 5 that acquire information on a surrounding environment of the vehicle or nearby objects. Specifically, the former sensors include, for example, a vehicle speed sensor 2 that measures a traveling speed of the vehicle from rotation speeds of vehicle wheels and a yaw rate sensor 3 that measures a turning angular velocity of the vehicle. The latter sensors include, for example, a millimeter wave sensor 4 that is provided in a front grille of the vehicle and a camera sensor 5 that is provided in a front windshield of the vehicle. The camera sensor is configured as a stereoscopic camera that can measure a distance to an imaging target. These sensors 2, 3, 4, and 5 are connected to the vehicle controller 10 directly or via a communication network such as a controller area network (CAN) which is built into the vehicle.

The various actuators 6 and 7 include a braking actuator 6 for decelerating the vehicle and a steering actuator 7 for steering the vehicle. The braking actuator 6 is, for example, a hydraulic brake. Here, when the vehicle is a hybrid vehicle or an electric vehicle, the braking actuator 6 also includes a regenerative brake. The steering actuator 7 is a power steering system using a motor or a hydraulic pressure. The HMI 8 is an interface that is used to output and input information between a driver and the vehicle controller 10. The HMI 8 includes, for example, a display that displays image information for the driver, a speaker that outputs speech, and a touch panel that is used for the driver to perform an input operation.

The vehicle controller 10 is an electronic control unit (ECU) including at least one CPU, at least one ROM, and at least one RAM. Various programs for collision avoidance or a variety of data including maps is stored in the ROM. By loading a program stored in the ROM into the RAM and causing the CPU to execute the loaded program, various functions are embodied in the vehicle controller 10. The vehicle controller 10 may include a plurality of ECUs. Functions particularly associated with collision avoidance among functions of the vehicle controller 10 are expressed as blocks in FIG. 1. Other functions of the vehicle controller 10 are not illustrated.

When a moving object such as a pedestrian, a bicycle, or an automobile is moving in front of the host vehicle, the vehicle controller 10 has a function of detecting a likelihood of collision therewith and performing driving support for collision avoidance. This function is realized by a host vehicle information acquiring unit 11, an object recognizing unit 12, a risk parameter calculating unit 13, a risk determining unit 14, a collision-determination parameter calculating unit 15, a control parameter setting unit 16, an operation determining unit 17, an automatic braking control unit 21, an automatic steering control unit 22, and a notification control unit 23 which are included in the vehicle controller 10. These units are not disposed in hardware in the vehicle controller 10 but are embodied in software when a program stored in the ROM is executed by the CPU.

The host vehicle information acquiring unit 11 acquires information from the vehicle speed sensor 2 and information from the yaw rate sensor 3 and calculates a movement state of the host vehicle based on the acquired information. The host vehicle information acquiring unit 11 predicts a course of the host vehicle from the movement state of the host vehicle. In addition to the vehicle speed and the yaw rate, an actual steering angle acquired from a steering angle sensor which is not illustrated may be used for prediction of the course of the host vehicle. The host vehicle information acquiring unit 11 updates the host vehicle coordinate system (the reference coordinate system) constructed on a computer based on the predicted course. The host vehicle coordinate system is a coordinate system in which a Y axis is set in a direction of the predicted course of the host vehicle and an X axis is set in a width direction of the host vehicle with a reference point set on the host vehicle as an origin.

The object recognizing unit 12 recognizes an object which is present near the host vehicle. Information acquired from the millimeter wave sensor 4 and the camera sensor 5 is used for recognition of a nearby object. The object recognizing unit 12 can recognize a nearby object by at least one method of a method using information from the millimeter wave sensor 4, a method using information from the camera sensor 5, and a method of using a combination of information from the millimeter wave sensor 4 and information from the camera sensor 5 based on sensor fusion. A recognized nearby object includes a moving object such as a pedestrian, a bicycle, or an automobile or a stationary object such as a stopped vehicle, a guard rail, a building, or a tree. The object recognizing unit 12 also recognizes a division line such as a road edge line or a road center line by processing a captured image acquired from the camera sensor 5. The object recognizing unit 12 calculates position coordinates in the host vehicle coordinate system of the recognized object or the like.

When two or more objects are recognized by the object recognizing unit 12, the risk parameter calculating unit 13 calculates a predetermined risk parameter based on a relative relationship between the objects. The relative relationship between the objects includes a direction, a distance, a relative speed, and a relative position. The risk parameter means a parameter for determining a level of a risk that an object will enter the course of the host vehicle. The risk parameter which is calculated by the risk parameter calculating unit 13 will be described below with reference to FIG. 2.

Figure 2:
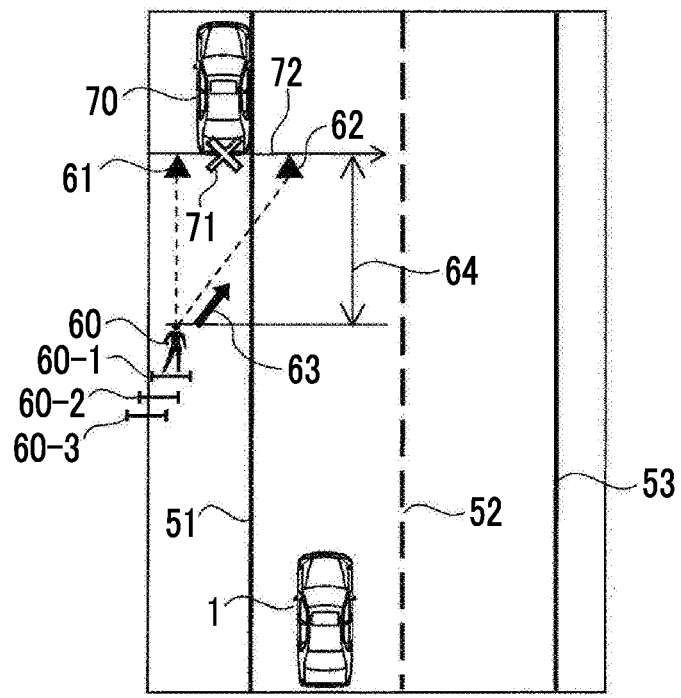
FIG. 2 is a diagram illustrating a risk parameter.

In FIG. 2, a host vehicle 1, a stopped vehicle 70 which is a stationary object, and a pedestrian 60 which is a moving object are illustrated. Right and left road edge lines 51 and 53 are indicated by solid lines, and a road center line 52 is indicated by a dotted line. FIG. 2 illustrates a positional relationship between the objects 1, 60, and 70 and the lines 51, 52, and 53. Here, it is assumed that only the stopped vehicle 70 and the pedestrian 60 are recognized by the object recognizing unit 12 and the pedestrian 60 moves obliquely with respect to the stopped vehicle 70 outside the road edge line 51. The road illustrated in FIG. 2 is a left-hand traffic road, but the disclosure can also be applied to a vehicle traveling on a right-hand traffic road.

The risk parameter calculating unit 13 constructs a stationary object coordinate system with a reference point 71 set on the stopped vehicle 70 which is a stationary object as an origin on a computer. In the stationary object coordinate system, an X axis 72 is set in the width direction of the road and a Y axis which is not illustrated is set in a vehicle traveling direction of the road with reference to the reference point 71. A method of setting the reference point 71 is not particularly limited. Here, the reference point 71 is set at the center of a rear end of the stopped vehicle 70 recognized from a camera image.

The risk parameters calculated by the risk parameter calculating unit 13 include a risk-determination lateral position 61, a risk-determination lateral collision position 62, and a risk-determination TTC 64. The risk-determination lateral position 61 is a position in a road width direction of the pedestrian 60 relative to the stopped vehicle 70, that is, an X coordinate of the pedestrian 60 in the stationary object coordinate system. The risk parameter calculating unit 13 acquires the X coordinate of the pedestrian 60 at the current time as the risk-determination lateral position 61. The risk parameter calculating unit 13 updates the risk-determination lateral position 61 at each of control times.

The risk-determination lateral collision position 62 is a position in the road width direction when the pedestrian 60 is level with the stopped vehicle 70 in the vehicle traveling direction, that is, an X coordinate of the pedestrian 60 when the pedestrian 60 moves to the X axis 72 in the stationary object coordinate system in the future. In order to calculate the risk-determination lateral collision position 62, the risk parameter calculating unit 13 calculates a movement vector 63 of the pedestrian 60 from a history of position coordinates of the pedestrian 60 in the stationary object coordinate system. In FIG. 2, a position 60-1 of the pedestrian 60 at a last control time, a position 60-2 of the pedestrian 60 at a last control time but one, and a position 60-3 of the pedestrian 60 at a last control time but two are illustrated. The risk parameter calculating unit 13 calculates the movement vector 63 from the coordinates of the positions 60-1, 60-2, and 60-3 and calculates the risk-determination lateral collision position 62 based on the position coordinates of the pedestrian 60 at the current time and the movement vector 63. The risk parameter calculating unit 13 updates the risk-determination lateral collision position 62 for each control time.

The risk-determination TTC 64 is a time until the pedestrian 60 will be level with the stopped vehicle 70 in the vehicle traveling direction, that is, a time until the pedestrian 60 will collide with the stopped vehicle 70 (time-to-collision: TTC). The risk parameter calculating unit 13 calculates the risk-determination TTC 64 by dividing a distance between the stopped vehicle 70 and the pedestrian 60 by a speed difference (a relative speed). In FIG. 2, a length of an arrow indicating the risk-determination TTC 64 represents a time. The distance which is used for calculating the risk-determination TTC 64 is a distance in the vehicle traveling direction which is perpendicular to the X axis 72, and the relative speed which is used for calculating the risk-determination TTC 64 is a relative speed in the vehicle traveling direction which is perpendicular to the X axis 72. The risk parameter calculating unit 13 updates the risk-determination TTC 64 for each control time. Instead of the risk-determination TTC 64 or in addition to the risk-determination TTC 64, the distance between the pedestrian 60 and the stopped vehicle 70 may be used as a risk parameter. In this case, the distance, that is, the risk-determination distance, is a distance in the vehicle traveling direction which is perpendicular to the X axis 72.

The above-mentioned calculation of the risk parameters is not performed when the number of objects recognized by the object recognizing unit 12 is only one. When two or more objects are recognized by the object recognizing unit 12 but the recognized objects do not include a moving object, the calculation of the risk parameter may not be performed. Calculation of the risk parameters when a stationary object and a plurality of moving objects are recognized by the object recognizing unit 12 or when a plurality of moving objects are recognized will be described later.

Referring back to FIG. 1, the risk determining unit 14 will be described below. The risk determining unit 14 determines a level of a risk that the object recognized by the object recognizing unit 12 will enter the course of the host vehicle by comparing the risk parameter calculated by the risk parameter calculating unit 13 with a predetermined threshold range. Determination of a risk which is performed by the risk determining unit 14 will be described below with reference to FIGS. 3 to 6C.

Figure 3:
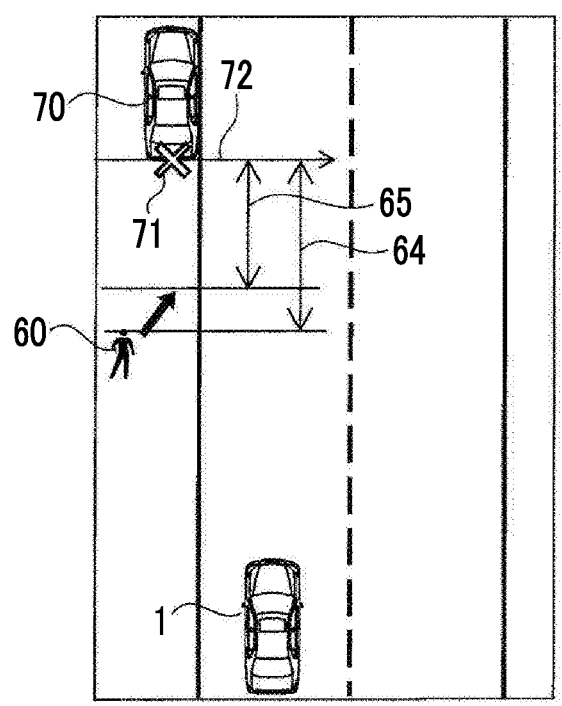
FIG. 3 is a diagram illustrating determination of a risk based on comparison between a risk-determination TTC and a threshold range thereof.

FIG. 3 is a diagram illustrating determination of a risk based on comparison between a risk-determination TTC and a threshold range thereof. In FIG. 3, a risk-determination TTC 64 and a threshold range 65 thereof along with a stopped vehicle 70 and a pedestrian 60 are illustrated. The threshold range of the risk-determination TTC is expressed by a distance in the Y-axis direction which is not illustrated from the X axis 72 in the stationary object coordinate system. Here, the dimension on the Y axis when the risk-determination TTC is treated as the risk parameter is time, and the time on the X axis 72 is zero. Since the time until the pedestrian 60 reaches the X axis 72 in the stationary object coordinate system is associated with a distance (a spatial distance) from the pedestrian 60 to the stopped vehicle 70, an XY plane of the stationary object coordinate system is made to coincide with the road surface in FIG. 2. The risk determining unit 14 compares the risk-determination TTC 64 with the threshold range 65 thereof and sets a first flag when the risk-determination TTC 64 enters the threshold range 65.

When a risk-determination distance instead of the risk-determination TTC is used as the risk parameter, determination of a risk is performed by comparison between the risk-determination distance and a threshold range thereof. The dimension on the Y axis in the stationary object coordinate system when the risk-determination distance is treated as the risk parameter is length, and the threshold range of the risk-determination distance is expressed by a distance in the Y-axis direction from the X axis 72 in the stationary object coordinate system (hereinafter, a distance is simply referred to as a spatial distance). In this case, the risk determining unit 14 compares the risk-determination distance with the threshold range thereof and sets the first flag when the risk-determination distance enters the threshold range.

Figure 4:
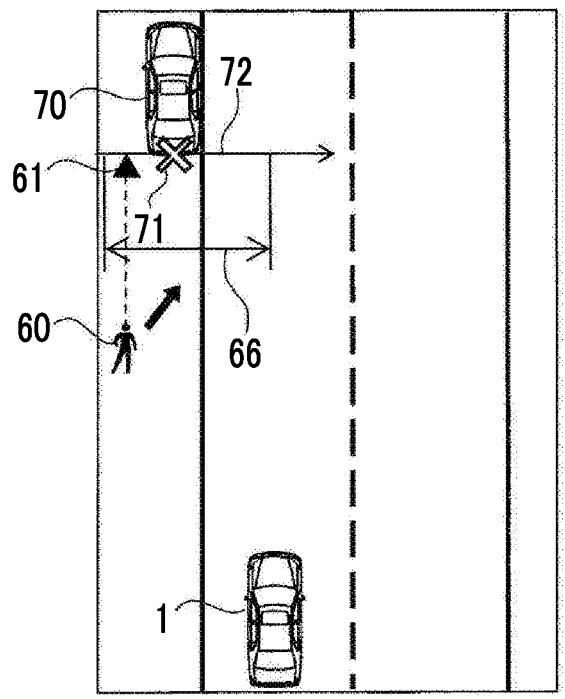
FIG. 4 is a diagram illustrating determination of a risk based on comparison between a risk-determination lateral position and a threshold range thereof.

FIG. 4 is a diagram illustrating determination of a risk based on comparison between a risk-determination lateral position and a threshold range thereof. In FIG. 4, a risk-determination lateral position 61 and a threshold range 66 thereof along with a stopped vehicle 70 and a pedestrian 60 are illustrated. The threshold range of the risk-determination lateral position is expressed by an upper limit and a lower limit of an X coordinate in the stationary object coordinate system. The risk determining unit 14 compares the risk-determination lateral position 61 with the threshold range 66 thereof and sets a second flag when the risk-determination lateral position 61 enters the threshold range 66, that is, when the risk-determination lateral position 61 enters a range between the upper limit and the lower limit.

Figure 5:
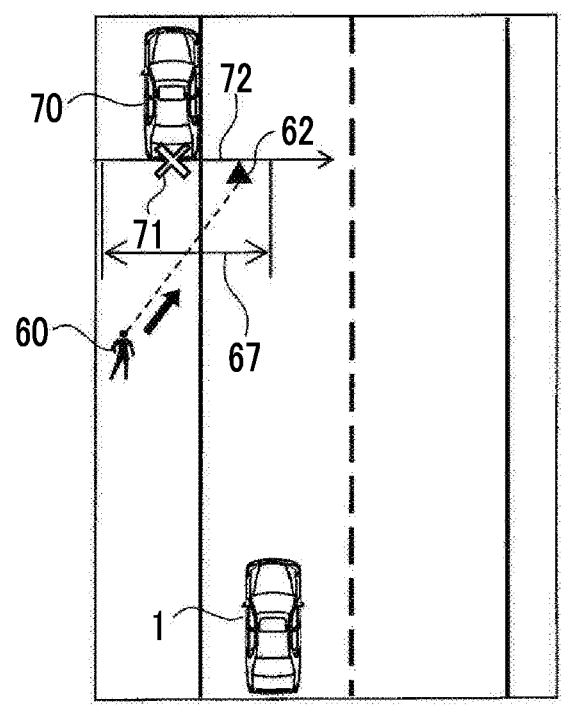
FIG. 5 is a diagram illustrating determination of a risk based on comparison between a risk-determination lateral collision position and a threshold range thereof.

FIG. 5 is a diagram illustrating determination of a risk based on comparison between a risk-determination lateral collision position and a threshold range thereof. In FIG. 5, a risk-determination lateral collision position 62 and a threshold range 67 thereof along with a stopped vehicle 70 and a pedestrian 60 are illustrated. The threshold range of the risk-determination lateral collision position is expressed by an upper limit and a lower limit of an X coordinate in the stationary object coordinate system. The risk determining unit 14 compares the risk-determination lateral collision position 62 with the threshold range 67 thereof and sets a third flag when the risk-determination lateral collision position 62 enters the threshold range 67, that is, when the risk-determination lateral collision position 62 enters a range between the upper limit and the lower limit.

When all of the first flag, the second flag, and the third flag have been set, the risk determining unit 14 determines that the risk of the pedestrian 60 who is a subject for determination of a risk is "high." On the other hand, when either of the first flag, the second flag, and the third flag is not set, the risk determining unit 14 determines that the risk of the pedestrian 60 who is subjected to determination of a risk is "low." That is, determination of a risk which is performed by the risk determining unit 14 in this embodiment is a two-stage evaluation of "high" and "low." Therefore, the determination of a risk may be replaced with determination of whether there is a risk instead of determination of whether a risk is high or low. As another method of determination of a risk, a multi-stage evaluation in which a level of a risk is evaluated in multiple stages depending on the number of flags which has been set may be performed. For example, as the number of flags increases to 0, 1, 2, and 3, the determination result of a risk may vary gradually from low to high.

Figure 6A:
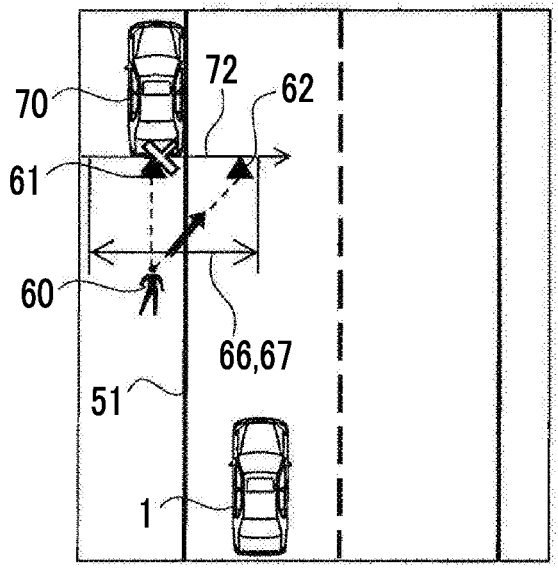
FIGS. 6A, 6B, and 6C are diagrams illustrating an example of determination of a risk by cases.
Figure 6B:
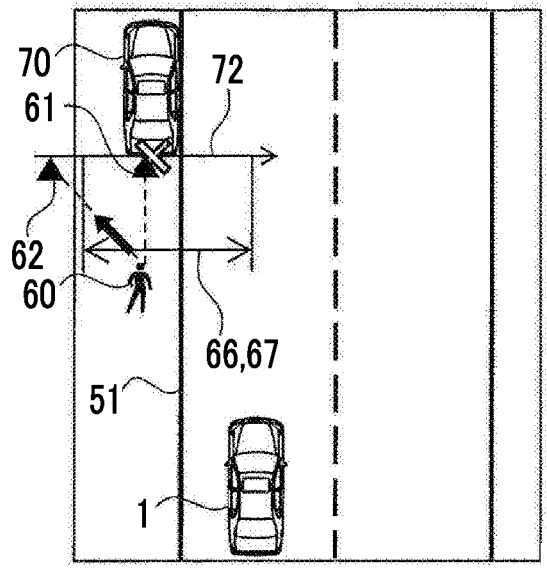
Figure 6C:
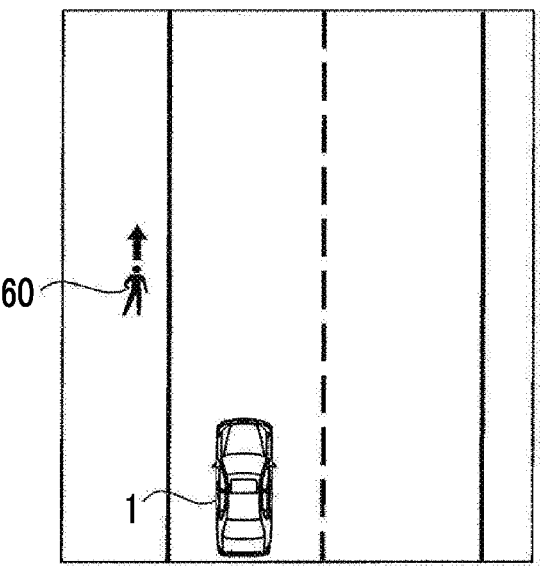

Each of FIGS. 6A-6C is a diagram illustrating an example of determination of a risk by cases. In FIGS. 6A-6C, three cases which are different in a relative relationship between a host vehicle 1, a stopped vehicle 70 which is a stationary object, and a pedestrian 60 which is a moving object are illustrated. Cases illustrated in FIGS. 6A, 6B, and 6C are Cases 1A, 1B, and 1C, respectively. A stopped vehicle 70 and a pedestrian 60 in front of the host vehicle 1 are recognized in Case 1A and Case 1B, and only a pedestrian 60 in front of the host vehicle 1 is recognized in Case 1C. The pedestrian 60 moves obliquely to a traveling lane in Case 1A, and the pedestrian 60 moves obliquely to the side opposite to the traveling lane in Case 1B. As will be described below, the risk determining unit 14 performs determination of a risk appropriately depending on cases.

In Case 1A, the pedestrian 60 intends to bypass the stopped vehicle 70 to the traveling lane side. In this case, since the pedestrian 60 enters the traveling lane, that is, the inside of the road edge line 51, a likelihood that the pedestrian 60 will enter the course of the host vehicle 1 increases. When it is assumed that the risk-determination TTC is in the threshold range, the risk-determination lateral position 61 is in the threshold range 66 and the risk-determination lateral collision position 62 is in the threshold range 67. Accordingly, in determination of a risk by the risk determining unit 14, the risk for the pedestrian 60 is determined to be "high." In this embodiment, the threshold range 66 of the risk-determination lateral position and the threshold range 67 of the risk-determination lateral collision position match each other, but both ranges may be set to be different from each other.

On the other hand, in Case 1B, the pedestrian 60 intends to bypass the stopped vehicle 70 on the side opposite to the traveling lane. In this case, since the pedestrian 60 does not enter the inside of the road edge line 51, a likelihood that the pedestrian 60 will enter the course of the host vehicle 1 is low. When it is assumed that the risk-determination TTC is in the threshold range, the risk-determination lateral position 61 is in the threshold range 66, but the risk-determination lateral collision position 62 is not in the threshold range 67.

Accordingly, in determination of a risk by the risk determining unit 14, the risk for the pedestrian 60 is determined to be "low."

On the other hand, in Case 1C, since there is no stationary object in a moving direction of the pedestrian 60, there is no likelihood that the pedestrian 60 will enter the course of the host vehicle 1 to avoid a stationary object. In this case, since an object recognized by the object recognizing unit 12 is only the pedestrian 60, calculation of the risk parameters by the risk parameter calculating unit 13 is not performed. Determination of a risk by the risk determining unit 14 is also not performed. In driving support control by the vehicle controller, when the number of objects recognized by the object recognizing unit 12 is one as in Case 1C, the same control as when the risk is determined to be low is performed. This will be described later.

Referring back to FIG. 1, the collision-determination parameter calculating unit 15 will be described below. When an object is recognized by the object recognizing unit 12, the collision-determination parameter calculating unit 15 calculates a predetermined collision-determination parameter based on a relative relationship between the object and the host vehicle. The collision-determination parameter refers to a parameter for determining whether the host vehicle will collide with an object. The collision-determination parameter which is calculated by the collision-determination parameter calculating unit 15 will be described below with reference to FIG. 7.

Figure 7:
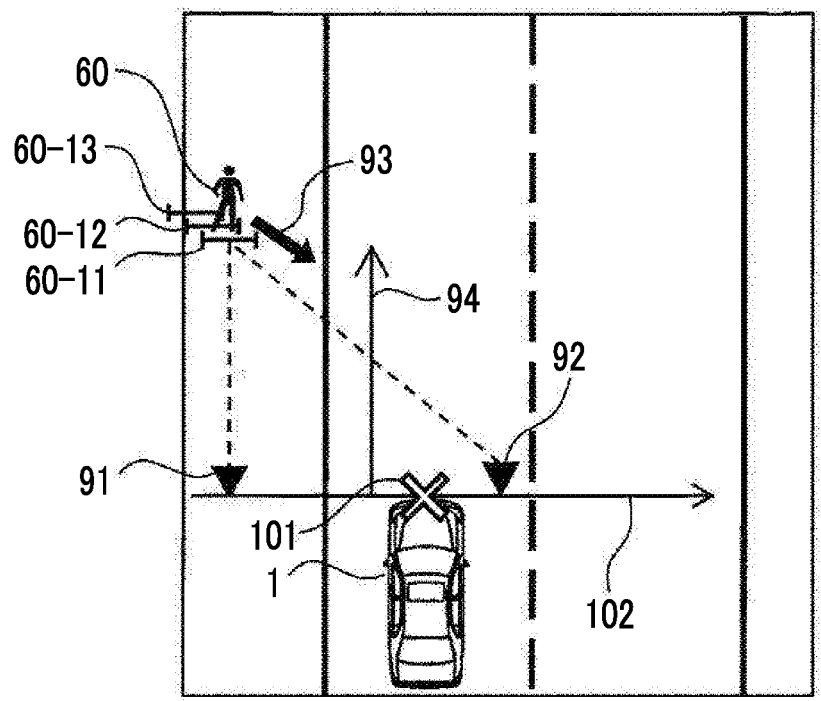
FIG. 7 is a diagram illustrating a collision-determination parameter.

In FIG. 7, the host vehicle 1 and a pedestrian 60 which is a moving object are illustrated in the host vehicle coordinate system. In the host vehicle coordinate system, an X axis 102 is set in the width direction of the host vehicle 1 with respect to a reference point 101 set at the center of the front of the host vehicle 1, and a Y axis which is not illustrated is set in a direction of a predicted course of the host vehicle 1. Here, the dimension on the Y axis when TTC is treated in the host vehicle coordinate system is time, and the time on the X axis 102 is zero. Since a time until the pedestrian 60 reaches the X axis 102 in the host vehicle coordinate system and a distance from the pedestrian 60 to the host vehicle 1 are associated with each other, an XY plane of the host vehicle coordinate system is expressively matched with the road surface in FIG. 7.

The collision-determination parameters calculated by the collision-determination parameter calculating unit 15 include a collision-determination lateral position 91, a collision-determination lateral collision position 92, and a collision-determination TTC 94. The collision-determination lateral position 91 is a position in a road width direction of the pedestrian 60 relative to the host vehicle 1, that is, an X coordinate of the pedestrian 60 in the host vehicle coordinate system. The collision-determination parameter calculating unit 15 acquires the X coordinate of the pedestrian 60 at the current time as the collision-determination lateral position 91. The collision-determination parameter calculating unit 15 updates the collision-determination lateral position 91 for each control time.

The collision-determination lateral collision position 92 is a position in the road width direction when the pedestrian 60 is level with the host vehicle 1 in a direction of a predicted course of the host vehicle 1, that is, an X coordinate of the pedestrian 60 when the pedestrian 60 moves to the X axis 102 in the host vehicle coordinate system in the future. In order to calculate the collision-determination lateral collision position 92, the collision-determination parameter calculating unit 15 calculates a movement vector 93 of the pedestrian 60 from a history of position coordinates of the pedestrian 60 in the host vehicle coordinate system. In FIG. 7, a position 60-11 of the pedestrian 60 at a last control time, a position 60-12 of the pedestrian 60 at a last control time but one, and a position 60-13 of the pedestrian 60 at a last control time but two are illustrated. The collision-determination parameter calculating unit 15 calculates the movement vector 93 from the coordinates of the positions 60-11, 60-12, and 60-13 and calculates the collision-determination lateral collision position 92 based on the position coordinates of the pedestrian 60 at the current time and the movement vector 93. The collision-determination parameter calculating unit 15 updates the collision-determination lateral collision position 92 for each control time.

The collision-determination TTC 94 is a time until the pedestrian 60 is level with the host vehicle 1 in the direction of the predicted course of the host vehicle 1, that is, a time until the pedestrian 60 collides with the host vehicle 1 (time-to-collision: TTC). The collision-determination parameter calculating unit 15 calculates the collision-determination TTC 94 by dividing a distance between the host vehicle 1 and the pedestrian 60 by a speed difference (a relative speed). In FIG. 7, a length of an arrow indicating the collision-determination TTC 94 represents a time. The distance which is used for calculating the collision-determination TTC 94 is a distance in the direction of the predicted course which is perpendicular to the X axis 102, and the relative speed which is used for calculating the collision-determination TTC 94 is a relative speed in the direction of the predicted course which is perpendicular to the X axis 102. The collision-determination parameter calculating unit 15 updates the collision-determination TTC 94 for each control time. Instead of the collision-determination TTC 94 or in addition to the collision-determination TTC 94, the distance between the pedestrian 60 and the host vehicle 1 may be used as the collision-determination parameter. In this case, the distance, that is, the collision-determination distance, is a distance in the direction of the predicted course which is perpendicular to the X axis 102.

Referring back to FIG. 1, the control parameter setting unit 16 will be described below. When determination by the risk determining unit 14 has been performed, the determination result is sent to the control parameter setting unit 16. The control parameter setting unit 16 may serve as a "driving support unit" along with the collision-determination parameter calculating unit 15 and the operation determining unit 17, the automatic braking control unit 21, the automatic steering control unit 22, and the notification control unit 23 which will be described later.

The control parameter setting unit 16 sets control parameters of driving support for avoiding collision with a moving object based on whether determination of a risk by the risk determining unit 14 has been performed and the determination result when the determination of a risk has been performed. Driving support for collision avoidance includes supporting deceleration of the host vehicle by a driver by controlling the braking actuator 6, supporting avoidance steering of the host vehicle by the driver by controlling the steering actuator 7, and issuing an alarm to the driver through speech or screen display using the HMI 8. When the braking actuator is a hydraulic brake, driving support for collision avoidance may include increasing a brake pressure in advance and/or reducing a brake pad in advance.

The control parameters set by the control parameter setting unit 16 include a control value and a threshold range. The control value includes a braking force as a control quantity for deceleration support, a steering torque as a control quantity for avoidance steering support, and an avoidance margin. The avoidance margin refers to a margin in the road width direction with respect to a moving object when the host vehicle passes by the moving object. When the braking force is increased, strong deceleration is applied to the host vehicle and reliability of collision avoidance is increased, but an influence on the sensations of a driver is increased. When the steering torque or the avoidance margin is increased, turning movement generated in the host vehicle is increased and reliability of collision avoidance is increased, but an influence on senses of a driver is increased. Therefore, in setting the control values, a balance between reliability of collision avoidance and an influence on senses of a driver is important, and a result of determination of a risk is used as information for achieving the balance.

When the risk determining unit 14 has determined that a risk for an object which is a subject for determination of a risk is high, it is important to enhance reliability of collision avoidance for the object. In such an emergency, when a strong deceleration is applied to the host vehicle or a large turning movement occurs in the host vehicle, a driver feels a little discomfort. Therefore, the control parameter setting unit 16 increases the control values for an object for which a risk is determined to be high such that reliability of collision avoidance is enhanced. That is, increasing the braking force, increasing the steering torque, and increasing the avoidance margin are performed. In the example illustrated in FIG. 6A, the control values are increased in Case 1A.

When the risk determining unit 14 has determined that a risk for an object which is subjected to determination of a risk is low, it is not necessary to enhance reliability of collision avoidance for the object while causing discomfort to the driver. Accordingly, the control parameter setting unit 16 does not perform increasing the control values for an object for which a risk is determined to be low and sets the control values to normal values which are determined by a sensory test. The control parameter setting unit 16 sets the control values for an object which has not been subjected to determination of a risk by the risk determining unit 14 to normal values. In the example illustrated in FIGS. 6B and 6C, the control values in Cases 1B and 1C are set to normal values.

A control threshold range which is set by the control parameter setting unit 16 will be described below. The control threshold range is a threshold range which is set for the collision-determination parameters calculated by the collision-determination parameter calculating unit 15 and is a parameter for defining a target area in which driving support operates. The target area is set in front of the host vehicle in the host vehicle coordinate system. The front side of the host vehicle refers to the future with respect to the current time when the Y axis in the host vehicle coordinate system is a time axis. Setting of the control threshold range for defining a target area will be described below with reference to FIGS. 8 and 9.

Figure 8:
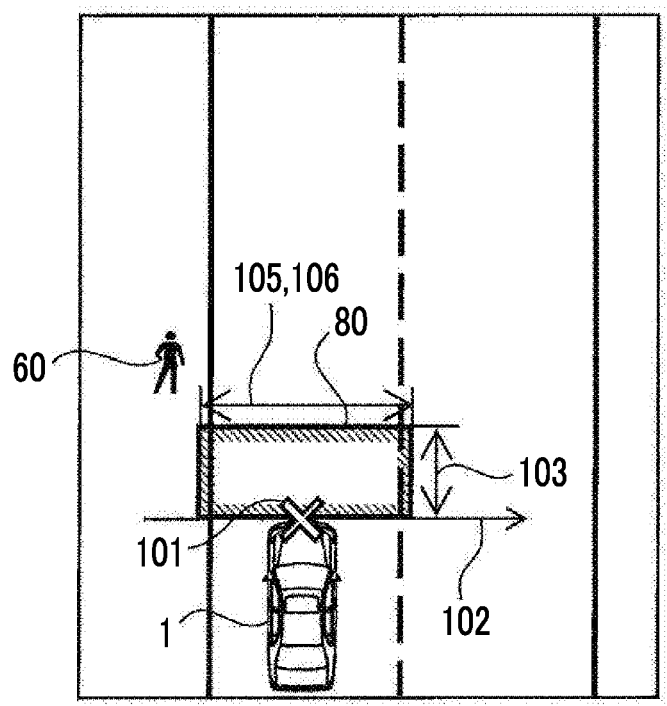
FIG. 8 is a diagram illustrating setting of a target area when a risk that an object will enter a course of a host vehicle is determined to be low.
Figure 9:
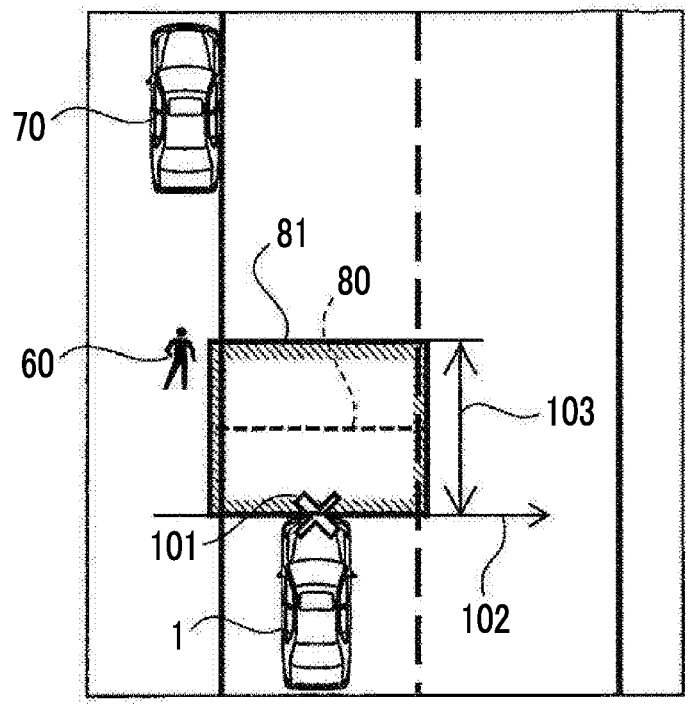
FIG. 9 is a diagram illustrating setting of a target area when a risk that an object will enter a course of a host vehicle is determined to be high.

FIGS. 8 and 9 illustrate positional relationships between the host vehicle 1 and target areas 80 and 81 in the host vehicle coordinate system. The target areas 80 and 81 are areas set in front of the host vehicle 1 from the X axis 102. A forward distance of the target areas 80 and 81 corresponds to the threshold range 103 of the collision-determination TTC as the collision-determination parameter. Therefore, the forward distance mentioned herein refers to a temporal distance from the current time. The widths in the X-axis direction from the target areas 80 and 81 correspond to the threshold range 105 of the collision-determination lateral position and the threshold range 106 of the collision-determination lateral collision position which are the collision-determination parameters. The rear ends of the target areas 80 and 81 do not strictly match the X axis 102. The target areas 80 and 81 are limited to the side in front from the X axis 102 due to a viewing angle of the camera sensor 5 or a detection angle of the millimeter wave sensor 4. Here, for the purpose of simplification of explanation, it is assumed that the viewing angle of the camera sensor 5 and the detection angle of the millimeter wave sensor 4 are both 180 degrees.

The target area 80 illustrated in FIG. 8 and the target area 81 illustrated in FIG. 9 are equal to each other in width, but the forward distance of the target area 81 is larger than that of the target area 80. The area of the target area is associated with a level of a probability or a time in which driving support operates. When the target area is set to be greater, the collision-determination parameter is more likely to enter the threshold range, and driving support is more likely to operate. Particularly, when the threshold range of the collision-determination TTC is set to be greater and the target area is enlarged forward, an operating time of driving support is advanced. When the operating time of driving support is advanced, reliability of collision avoidance is increased, but unnecessary intervention in a driving operation is greater and thus a driver is more likely to feel discomfort. Therefore, in setting the control threshold range, a balance between reliability of collision avoidance and an influence on senses of a driver is important, and results of determination of a risk are used as information for achieving the balance.

When the risk determining unit 14 has determined that a risk for an object which is subjected to determination of a risk is low, the control parameter setting unit 16 sets the threshold range 103 of the collision-determination TTC to a predetermined normal value. The normal value is determined by a sensory test associated with a relationship between an operating time and a driver's sensation. When the risk determining unit 14 has not performed determination of a risk, the threshold range 103 of the collision-determination TTC is set to a normal value. On the other hand, when the risk determining unit 14 has determined that a risk for an object which is subjected to determination of a risk is high, the control parameter setting unit 16 enlarges the threshold range 103 of the collision-determination TTC in comparison with the normal value. Accordingly, when a risk is low, a relatively small target area 80 is set as illustrated in FIG. 8. When a risk is high, a relatively large target area 81 is set as illustrated in FIG. 9.

The threshold range 105 of the collision-determination lateral position and the threshold range 106 of the collision-determination lateral collision position are set to fixed values regardless of a level of a risk in this embodiment. In this embodiment, the threshold range 105 of the collision-determination lateral position and the threshold range 106 of the collision-determination lateral collision position match each other, but they may be set to be different from each other.

Referring back to FIG. 1, the operation determining unit 17 will be described below. The operation determining unit 17 determines whether driving support for collision avoidance should operate by comparing the collision-determination parameters calculated by the collision-determination parameter calculating unit 15 with the threshold ranges set by the control parameter setting unit 16. Determination of an operation which is performed by the operation determining unit 17 will be described below with reference to FIG. 10.

Figure 10:
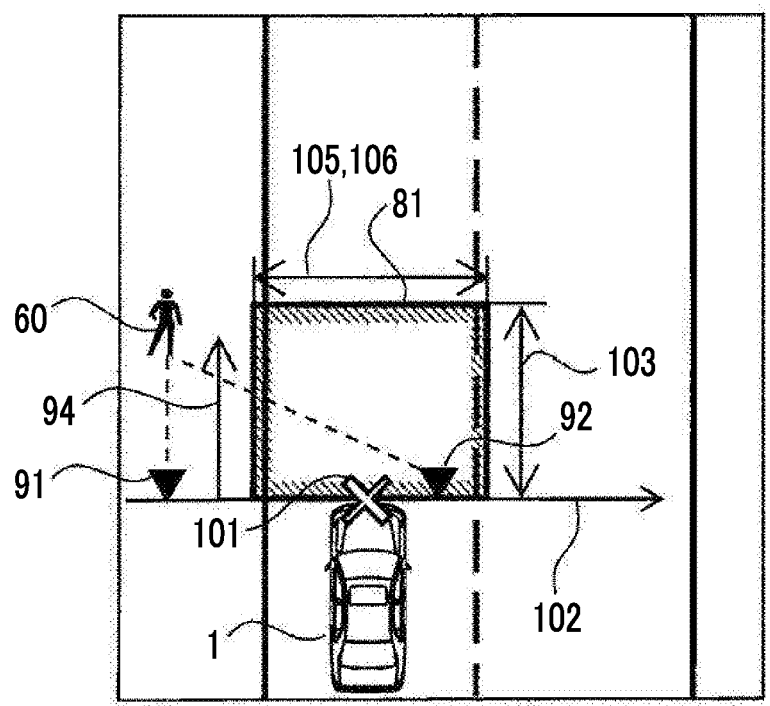
FIG. 10 is a diagram illustrating determination of an operation based on comparison between collision-determination parameters and threshold ranges thereof.

FIG. 10 is a diagram illustrating determination of an operation based on comparison between the collision-determination parameters and the threshold ranges thereof. In FIG. 10, the collision-determination lateral position 91, the collision-determination lateral collision position 92, and the collision-determination TTC 94 are illustrated along with a host vehicle 1 and a pedestrian 60. The threshold range 103 of the collision-determination TTC, the threshold range 105 of the collision-determination lateral position, and the threshold range 106 of the collision-determination lateral collision position, and a target area 81 which are defined thereby are also illustrated.

When the collision-determination TTC 94 is in the threshold range 103 thereof, the collision-determination lateral position 91 is in the threshold range 105 thereof, and the collision-determination lateral collision position 92 is in the threshold range 106 thereof, the operation determining unit 17 determines that the pedestrian 60 has entered the target area 81 and causes driving support for collision avoidance to operate. In the example illustrated in FIG. 10, the collision-determination TTC 94 is in the threshold range 103 and the collision-determination lateral collision position 92 is in the threshold range 106 thereof, but the collision-determination lateral position 91 is not in the threshold range 105 thereof. Accordingly, the operation determining unit 17 determines that driving support for collision avoidance should not operate at least at the current time point.

In this embodiment, the operation determining unit 17 causes avoidance steering support and deceleration support to operate depending on the situation. For example, when an avoidance margin can be secured in the traveling lane of the host vehicle, avoidance steering support operates prior to deceleration support. On the other hand, when an avoidance margin cannot be secured in the traveling lane of the host vehicle, avoidance steering support does not operate and deceleration support operates. When deceleration support operates, a deceleration request is output from the operation determining unit 17 to the automatic braking control unit 21. When avoidance steering support operates, an avoidance steering request is output from the operation determining unit 17 to the automatic steering control unit 22.

The operation determining unit 17 necessarily operates an alarm. When an alarm operates, a warning request is output from the operation determining unit 17 to the notification control unit 23. A time at which warning operates may be set to be earlier than a time at which avoidance steering support or deceleration support operates. In this case, when there is a likelihood of collision between an object in front of the host vehicle and the host vehicle, warning is issued prior to avoidance steering support or deceleration support. When a driver has performed an avoidance action in response to warning and thus the object has not entered the target area, neither avoidance steering support nor deceleration support is performed.

The automatic braking control unit 21 is a driving device that controls the braking actuator 6. The automatic steering control unit 22 is a driver that controls the steering actuator 7. The notification control unit 23 is a driver that controls the HMI 8. The automatic braking control unit 21, the automatic steering control unit 22, and the notification control unit 23 cause the braking actuator 6, the steering actuator 7, and the HMI 8 to operate in response to a request from the operation determining unit 17.

1-2. Driving Support Control for Collision Avoidance

Figure 11:
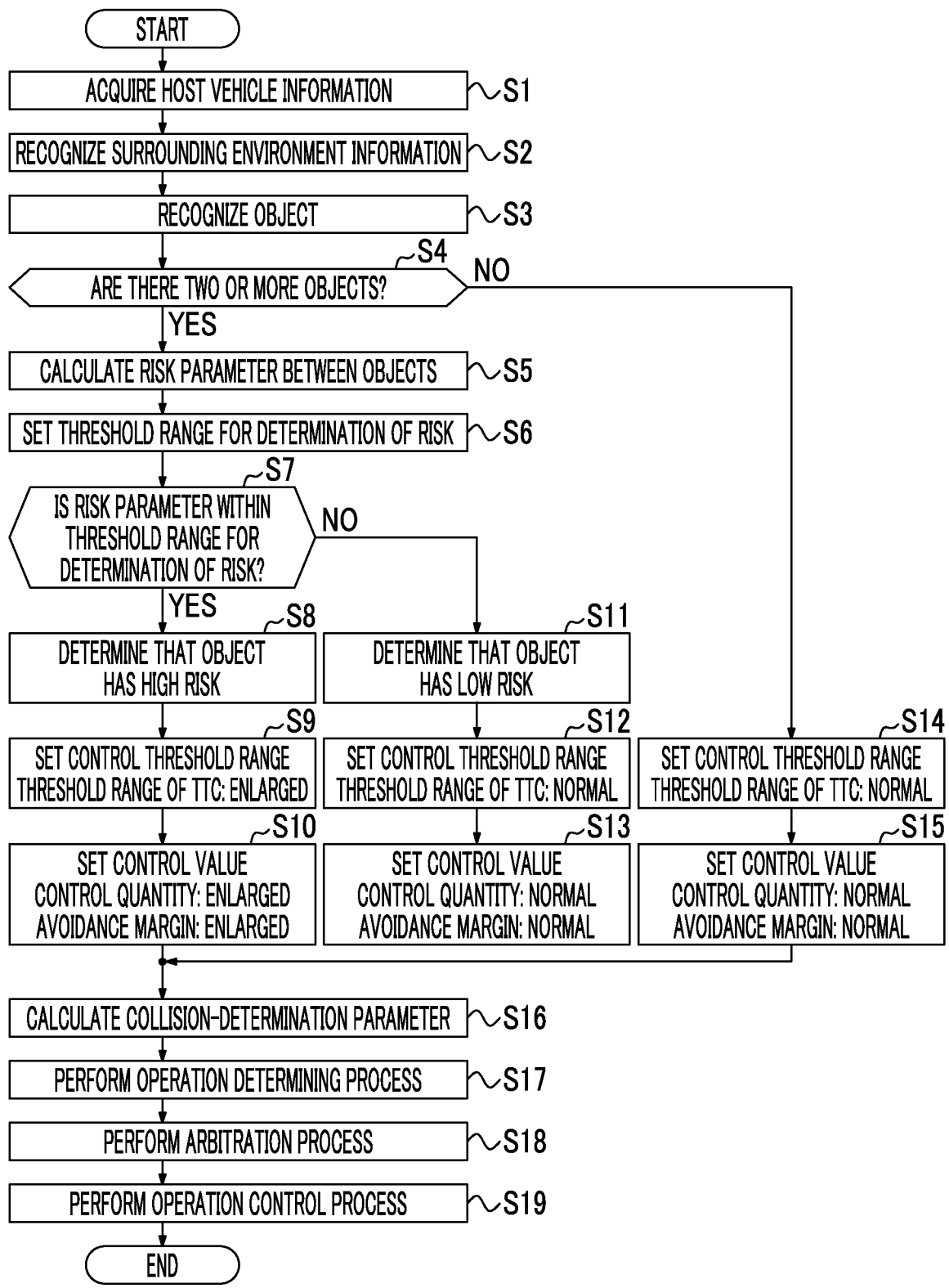
FIG. 11 is a flowchart illustrating a flow of driving support control for collision avoidance according to a first embodiment.

The vehicle controller 10 having the above-mentioned configuration performs driving support control for collision avoidance while the host vehicle 1 is being driven by a driver. FIG. 11 is a flowchart illustrating a flow of driving support control for collision avoidance according to this embodiment. The vehicle controller 10 repeatedly performs the routine illustrated in the flowchart at predetermined time intervals.

The process of Step S1 is performed by the host vehicle information acquiring unit 11. In Step S1, a movement state of the host vehicle is calculated based on information from the vehicle speed sensor 2 and information from the yaw rate sensor 3, and a course of the host vehicle is predicted from the movement state of the host vehicle.

The processes of Steps S2 and S3 are performed by the object recognizing unit 12. In Step S2, surrounding environment information is recognized using information acquired from the millimeter wave sensor 4 and information acquired from the camera sensor 5. In Step S3, an object is recognized in the surrounding environment information recognized in Step S2. In this process, a type of the object (such as an automobile, a pedestrian, or a bicycle) is recognized, for example, by pattern matching. In Step S3, stationary object information and moving object information are acquired from information of the recognized object. The stationary object information includes at least a position and a size of a stationary object. The moving object information includes at least a position and a size of a moving object.

The processes of Steps S4 and S5 are performed by the risk parameter calculating unit 13. In Step S4, it is determined whether the number of objects recognized in Step S3 is two or more. When the number of recognized objects is two or more, the process of Step S5 is performed. In Step S5, the risk parameters, that is, the risk-determination lateral position, the risk-determination lateral collision position, and the risk-determination TTC, are calculated based on the relative relationship between the recognized objects. When only one object is recognized in Step S3, the process of Step S5 is not performed.

Subsequently, the processes of Steps S6 and S7 are performed by the risk determining unit 14, and then the process of Step S8 or S11 is performed. In Step S6, the threshold ranges are set for the risk parameters. In Step S7, it is determined whether the risk parameters calculated in Step S5 are in the threshold ranges set in Step S6. When the risk parameters are in the threshold ranges, the process of Step S8 is performed and labeling indicating an object with a high risk is performed on the object to be determined. On the other hand, when the risk parameters are not in the threshold ranges, the process of Step S11 is performed and labeling indicating an object with a low risk is performed on the object to be determined.

The processes of Steps S9 and S10 are performed on an object labeled as an object with a high risk by the control parameter setting unit 16. In Step S9, the control threshold range is set such that the operating time of driving support is performed earlier than in a normal state. Specifically, the threshold range of the collision-determination TTC is increased in comparison with a normal value. The threshold range of the collision-determination lateral position and the threshold range of the collision-determination lateral collision position are set to normal values. In Step S10, the braking force and the steering torque as control quantities are increased in comparison with normal values and the avoidance margin is increased in comparison with a normal value.

The processes of Steps S12 and S13 are performed on an object labeled as an object with a low risk by the control parameter setting unit 16. In Step S12, the control threshold range is set such that the operating time of driving support is set to the same as in a normal state. Specifically, the threshold range of the collision-determination TTC is set to a normal value. In Step S13, the braking force and the steering torque as control quantities are set to normal values and the avoidance margin is set to a normal value.

When the determination result of Step S4 is negative, that is, when the number of recognized objects is one, the processes of Steps S14 and S15 are performed on the object by the control parameter setting unit 16. In Step S14, the threshold range of the collision-determination TTC is set to a normal value such that the operating time of driving support is set to the same as in a normal state. In Step S15, the braking force and the steering torque as control quantities are set to normal values and the avoidance margin is set to a normal value.

After the processes of Steps S9 and S10, after the processes of Steps S12 and S13, or after the processes of Steps S14 and S15, the process of Step S16 is performed by the collision-determination parameter calculating unit 15. In Step S16, the collision-determination parameters, that is, the collision-determination lateral position, the collision-determination lateral collision position, and the collision-determination TTC, are calculated based on the relative relationship between the recognized object and the host vehicle. In the flowchart, the collision-determination parameters are calculated after the control parameters are set, but the collision-determination parameters may be calculated before the control parameters are set.

The process of Step S17 is performed by the operation determining unit 17. In Step S17, it is determined whether driving support for collision avoidance should operate by comparing the collision-determination parameters calculated in Step S16 with the control threshold ranges set in Step S9. Specifically, when the collision-determination TTC is in the threshold range thereof, the collision-determination lateral position is in the threshold range thereof, and the collision-determination lateral collision position is in the threshold range thereof, driving support for collision avoidance is caused to operate. In this case, the braking force set in Step S10, S13, or S15 is given as a deceleration request to the automatic braking control unit 21, and the steering torque and the avoidance margin set in Step S10, S13, or S15 are given as an avoidance steering request to the automatic steering control unit 22. An alarm request is given to the notification control unit 23.

The processes of Steps S18 and S19 are performed by the automatic braking control unit 21, the automatic steering control unit 22, and the notification control unit 23. In Step S18, arbitration in control quantities or alarm requests is performed between the current control and other control. For example, for the braking force, there may be a request given from adaptive cruise control (hereinafter referred to as an ACC) to the automatic braking control unit 21. For the steering torque, there may be a request given from lane trace control (hereinafter referred to as an LTC) to the automatic steering control unit 22. The arbitration process is a process of determining the requests to be implemented in accordance with a predetermined priority order when requests are simultaneously given from a plurality of control processes. For the alarm request given to the notification control unit 23, when a plurality of alarm requests overlap each other, a preferential alarm is similarly determined by the arbitration process. In an example of the priority order, a request from the current control has priority to a request from the ACC or a request from the LTC. In Step S19, the braking actuator 6, the steering actuator 7, and the HMI 8 operate in response to the request determined by the arbitration process.

A pre-crash safety system (hereinafter referred to as a PCS) in the related art is provided in the vehicle controller 10 separately from the above-mentioned driving support control for collision avoidance. The PCS is a system that prevents collision or reduces damage at the time of collision by causing the braking actuator 6 or the steering actuator 7 to operate automatically when it is determined that there is a high likelihood of collision. When driving support for collision avoidance has operated but a driver has not performed an appropriate avoidance action, a likelihood of collision is increased. The PCS is provided to prevent collision or to reduce damage of collision in this case. The threshold range (the normal value) of the collision-determination TTC in driving support for collision avoidance is set to, for example, five seconds, but the threshold range of the collision-determination TTC in the PCS is set to, for example, three seconds.

Second Embodiment 2-1. Features of Second Embodiment

A second embodiment is characterized in setting a control threshold range for defining a target area in which driving support operates. This will be described below with reference to FIG. 12.

Figure 12:
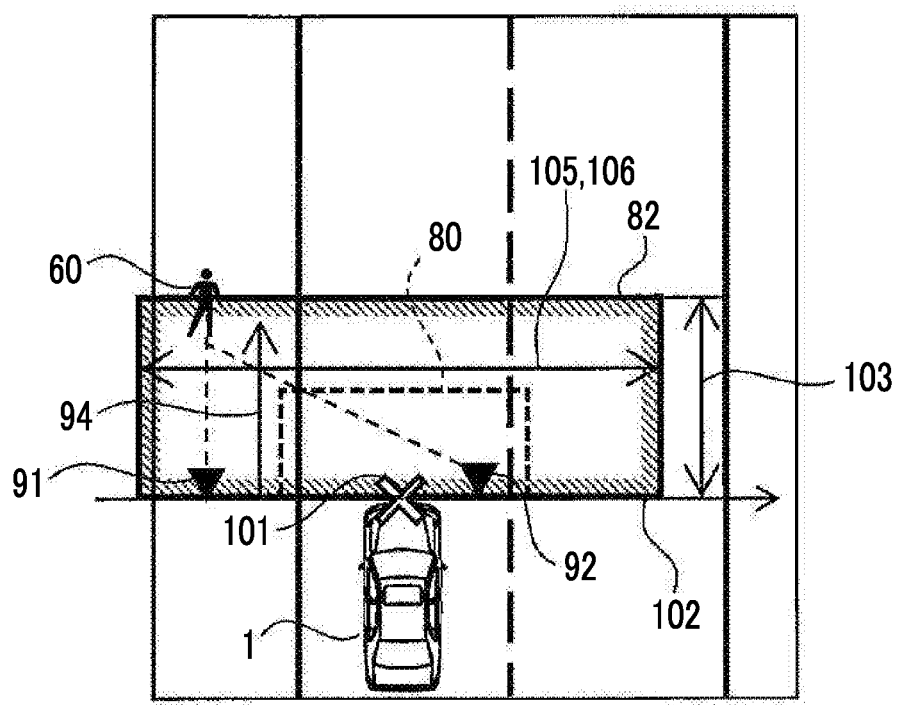
FIG. 12 is a diagram illustrating setting of a target area according to a second embodiment when a risk that an object will enter a course of a host vehicle is determined to be high.

FIG. 12 illustrates a positional relationship between the host vehicle 1 and target areas 80 and 82 in the host vehicle coordinate system. The target areas 80 and 82 are areas which are set in front of the host vehicle 1 from the X axis 102. The target area 80 indicated by a dotted line is a normal target area which is set when it is determined that a risk of an object which is subjected to determination of a risk is low. On the other hand, the target area 82 indicated by a solid line is a target area which is set when it is determined that a risk of an object which is subjected to determination of a risk is high. The target area 82 is enlarged in front of the vehicle 1 in comparison with the normal target area 80 and is enlarged in the width direction of the host vehicle 1.

The forward distance of the target area 82 corresponds to the threshold range 103 of the collision-determination TTC which is the collision-determination parameter. The width in the X-axis direction of the target area 82 corresponds to the threshold range 105 of the collision-determination lateral position and the threshold range 106 of the collision-determination lateral collision position which are the collision-determination parameters. When the risk determining unit 14 determines that a risk of an object which is subjected to determination of a risk is high, the control parameter setting unit 16 enlarges the threshold range 103 of the collision-determination TTC, the threshold range 105 of the collision-determination lateral position, and the threshold range 106 of the collision-determination lateral collision position in comparison with the normal values. In this embodiment, the threshold range 105 of the collision-determination lateral position and the threshold range 106 of the collision-determination lateral collision position are matched with each other, but may set to be different from each other.

By forward enlarging the threshold range 103 of the collision-determination TTC in comparison with the normal value to enlarge the target area 82, the collision-determination TTC is more likely to enter the threshold range and the operating time of driving support can be advanced. By enlarging the threshold range 105 of the collision-determination lateral position and the threshold range 106 of the collision-determination lateral collision position in comparison with the normal values to enlarge the target area 82 in the width direction of the host vehicle 1, the collision-determination lateral position and the collision-determination lateral collision position are more likely to enter the threshold ranges and driving support operate more easily.

In a specific example, when the target area 80 is set for the pedestrian 60 illustrated in FIG. 12, only the collision-determination lateral collision position 92 is in the threshold range thereof and thus driving support does not operate. When the target area 82 is set, the collision-determination TTC 94 is in the threshold range 103, and the collision-determination lateral position 91 and the collision-determination lateral collision position 92 are in the threshold ranges 105 and 106 thereof, respectively, and thus driving support operates. Accordingly, when the pedestrian 60 is an object with a high risk, it is possible to cause driving support to operate early with a high probability and to enhance reliability of collision avoidance. On the other hand, when the pedestrian 60 is an object with a low risk, it is possible to curb unnecessary intervention in driving by decreasing a probability of operation of driving support or relatively delaying the time at which driving support operates.

2-2. Driving Support Control for Collision Avoidance

Figure 13:
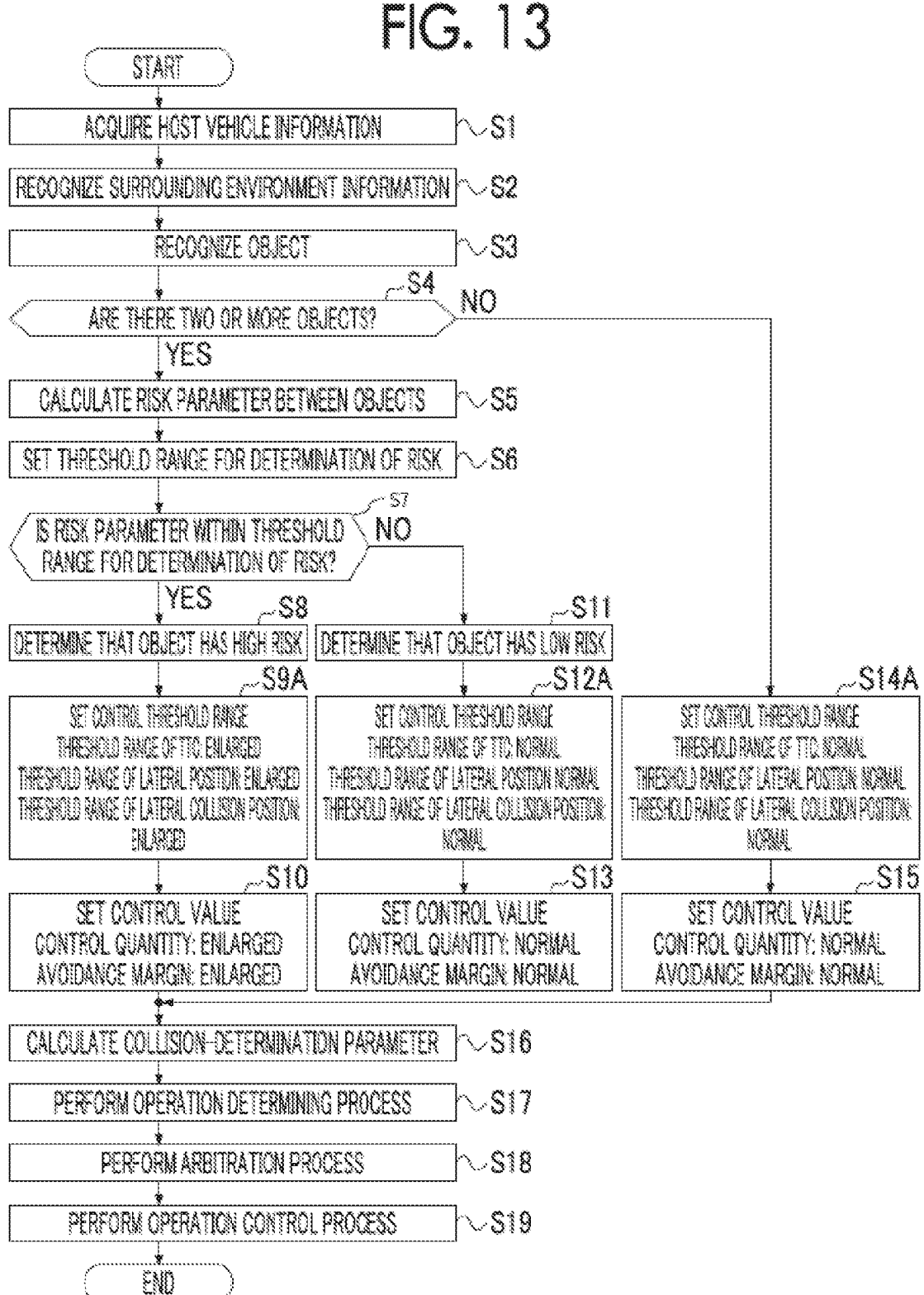
FIG. 13 is a flowchart illustrating a flow of driving support control for collision avoidance according to the second embodiment.

FIG. 13 is a flowchart illustrating a flow of driving support control for collision avoidance according to this embodiment. The vehicle controller 10 repeatedly performs the routine illustrated in the flowchart at predetermined time intervals. The same processes as those in driving support control according to the first embodiment will be referred to by the same step numbers in the flowchart and description thereof will not be repeated.

In this embodiment, the processes of Steps S9A and S10 are performed on an object which is labeled as an object with a high risk in Step S8 by the control parameter setting unit 16. In Step S9A, the control threshold ranges are set so that driving support operates earlier than in a normal state and a probability of operation of driving support increases. Specifically, enlargement of the threshold range of the collision-determination TTC in comparison with the normal value, enlargement of the threshold range of the collision-determination lateral position in comparison with the normal value, and enlargement of the threshold range of the collision-determination lateral collision position in comparison with the normal value are performed.

The processes of Steps S12A and S13 are performed on an object which is labeled as an object with a low risk in Step S11 by the control parameter setting unit 16. In Step S12A, the control threshold ranges are set so that the time at which driving support operates and the probability of operation of driving support are set to the same as in the normal state. Specifically, the threshold range of the collision-determination TTC, the threshold range of the collision-determination lateral position, and the threshold range of the collision-determination lateral collision position are set to the normal values.

When the determination result of Step S4 is negative, that is, when only one object is recognized, the processes of Steps S14A and S15 are performed on the object by the control parameter setting unit 16. In Step S14A, the control threshold ranges are set to the normal values so that the time at which driving support operates and the probability of operation of driving support are set to the same as in the normal state.

Third Embodiment 3-1. Features of Third Embodiment

A third embodiment is characterized in that the threshold ranges of the risk-determination lateral position and the risk-determination lateral collision position are restricted. This will be described below with reference to FIGS. 14 to 17B.

Figure 14:
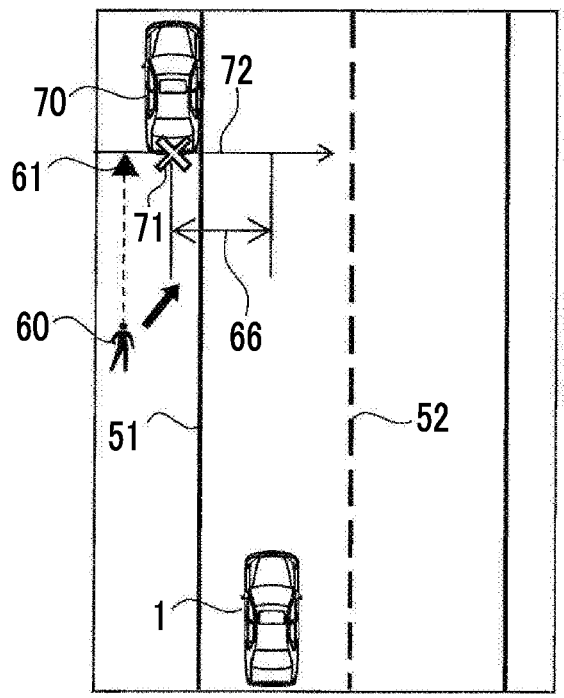
FIG. 14 is a diagram illustrating setting of a risk-determination lateral position and a threshold range thereof according to a third embodiment.

In FIG. 14, a risk-determination lateral position 61 and a threshold range 66 thereof are illustrated along with a stopped vehicle 70 and a pedestrian 60. In this embodiment, the threshold range 66 is set on the same side as the host vehicle 1 with respect to a reference point 71 set on the stopped vehicle 70 which is a stationary object. Specifically, when the same side as the host vehicle 1 with respect to the reference point 71 is defined as a positive direction of the X axis 72 in the stationary object coordinate system, a range from zero to a predetermined positive value is set as the threshold range 66. The predetermined value which is an upper limit of the threshold range 66 may be, for example, an X coordinate value between a road edge line 51 and a road center line 52 or an X coordinate value of the host vehicle 1 in the stationary object coordinate system.

Figure 15A:
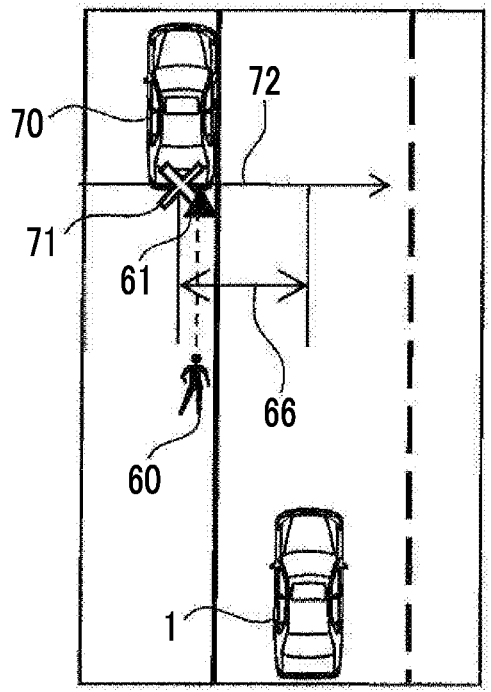
FIGS. 15A and 15B are diagrams illustrating an example of determination of a risk based on a threshold range of a risk-determination lateral position according to the third embodiment by cases.
Figure 15B:
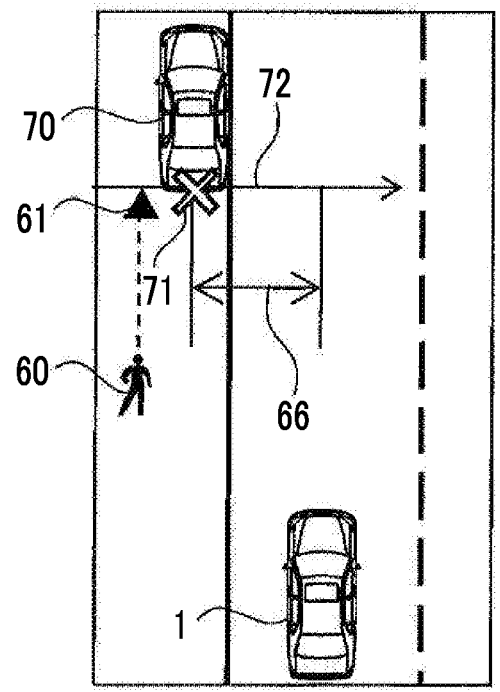

FIGS. 15A and 15B are diagrams illustrating an example of determination of a risk based on the threshold range of the risk-determination lateral position according to this embodiment by cases. In FIGS. 15A and 15B, two cases in which the positional relationship between the pedestrian 60 and the stopped vehicle 70 differs are illustrated. Cases illustrated in FIGS. 15A and 15B are Cases 2A and 2B, respectively. In Case 2A, the pedestrian 60 is located on the same side as the host vehicle 1 in the direction of the X axis 72 with reference to a reference point 71 on the stopped vehicle 70. In this case, the risk-determination lateral position 61 is in the threshold range 66 and thus the pedestrian 60 is determined to be an object with a high risk when both the risk-determination TTC and the risk-determination lateral collision position are in the threshold ranges thereof. On the other hand, in Case 2B, the pedestrian 60 is located on the opposite side of the host vehicle 1 in the direction of the X axis 72 with respect to the reference point 71 of the stopped vehicle 70. In this case, the risk-determination lateral position 61 is not in the threshold range 66 and thus the pedestrian 60 is not determined to be an object with a high risk even when both the risk-determination TTC and the risk-determination lateral collision position are in the threshold ranges thereof.

Figure 16:
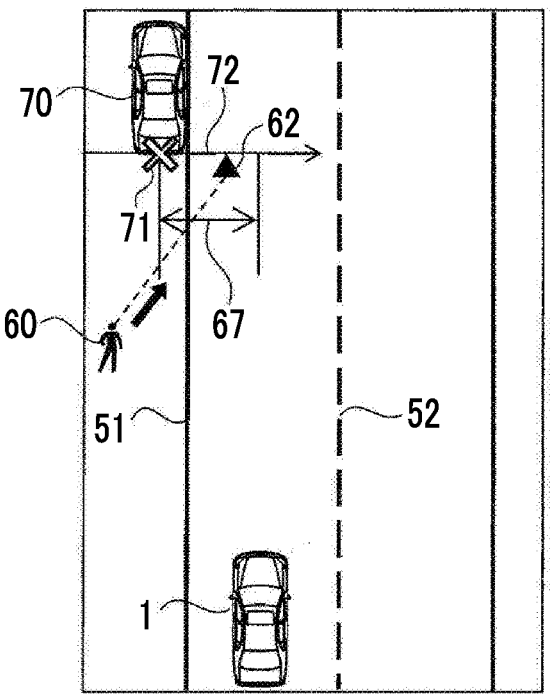
FIG. 16 is a diagram illustrating setting of a risk-determination lateral collision position and a threshold range thereof according to the third embodiment.

In FIG. 16, a risk-determination lateral collision position 62 and a threshold range 67 thereof are illustrated along with a stopped vehicle 70 and a pedestrian 60. In this embodiment, the threshold range 67 is set on the same side as the host vehicle 1 with respect to a reference point 71 set on the stopped vehicle 70 which is a stationary object. Specifically, when the same side as the host vehicle 1 with respect to the reference point 71 is defined as a positive direction of the X axis 72 in the stationary object coordinate system, a range from zero to a predetermined positive value is set as the threshold range 67. The predetermined value which is an upper limit of the threshold range 67 may be, for example, an X coordinate value between a road edge line 51 and a road center line 52 or an X coordinate value of the host vehicle 1 in the stationary object coordinate system.

Figure 17A:
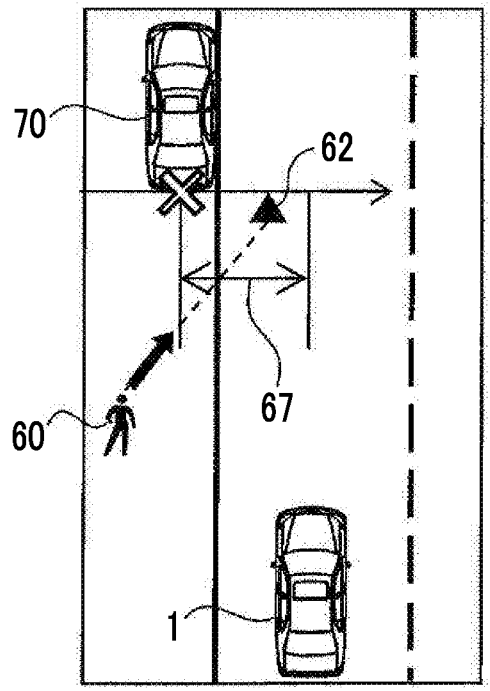
FIGS. 17A and 17B are diagrams illustrating an example of determination of a risk based on a threshold range of a risk-determination lateral collision position according to the third embodiment by cases.
Figure 17B:
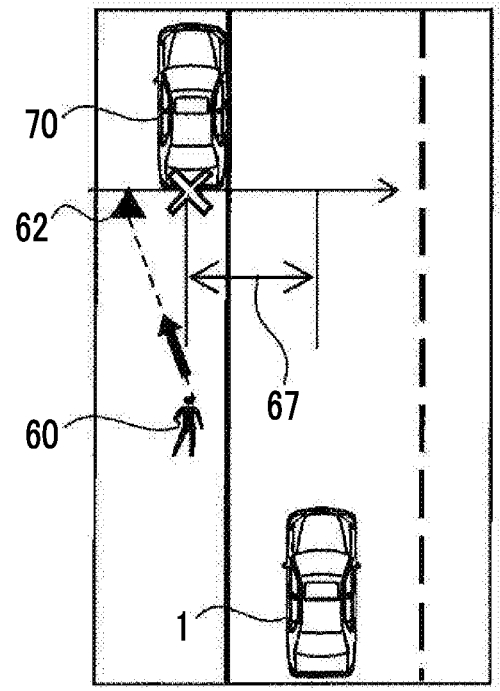

FIGS. 17A and 17B are diagrams illustrating an example of determination of a risk based on the threshold range of the risk-determination lateral collision position according to this embodiment by cases. In FIGS. 17A and 17B, two cases in which the positional relationship between the pedestrian 60 and the stopped vehicle 70 and a traveling direction of the pedestrian 60 differ are illustrated. Cases illustrated in FIGS. 17A and 17B are Cases 3A and 3B, respectively. In Case 3A, the pedestrian 60 intends to bypass the stopped vehicle 70 via the same side as the host vehicle 1 in the direction of the X axis 72 with reference to the reference point 71 on the stopped vehicle 70. In this case, the risk-determination lateral collision position 62 is in the threshold range 67 and thus the pedestrian 60 is determined to be an object with a high risk when both the risk-determination TTC and the risk-determination lateral position are in the threshold ranges thereof. On the other hand, in Case 3B, the pedestrian 60 intends to bypass the stopped vehicle 70 via the opposite side of the host vehicle 1 in the direction of the X axis 72 with respect to the reference point 71 of the stopped vehicle 70. In this case, the risk-determination lateral collision position 62 is not in the threshold range 67 and thus the pedestrian 60 is not determined to be an object with a high risk even when both the risk-determination TTC and the risk-determination lateral position are in the threshold ranges thereof.

When a moving object is located on the same side as the host vehicle with respect to a stationary object, the risk that the moving object will enter the course of the host vehicle is higher than when the moving object is located on the side opposite to the host vehicle with respect to the stationary object. When a moving object bypasses a stationary object via the same side as the host vehicle with respect to the stationary object, the risk that the moving object will enter the course of the host vehicle is higher than when the moving object bypasses the stationary object via the opposite side of the host vehicle with respect to the stationary object. Accordingly, by restricting the threshold range of the risk-determination lateral position and restricting the threshold range of the risk-determination lateral collision position as described above, it is possible to further enhance accuracy of determination of a risk.

Fourth Embodiment 4-1. Features of Fourth Embodiment

An object of which a risk parameter is in a threshold range for determination of a risk is determined to be an object with high risk. There is a likelihood that two or more objects with a high risk may be present depending on positional relationships between objects. A fourth embodiment is characterized in processes when there are a plurality of objects which are determined to be objects with a high risk in determination of a risk. This will be described below with reference to FIGS. 18 to 21.

Figure 18:
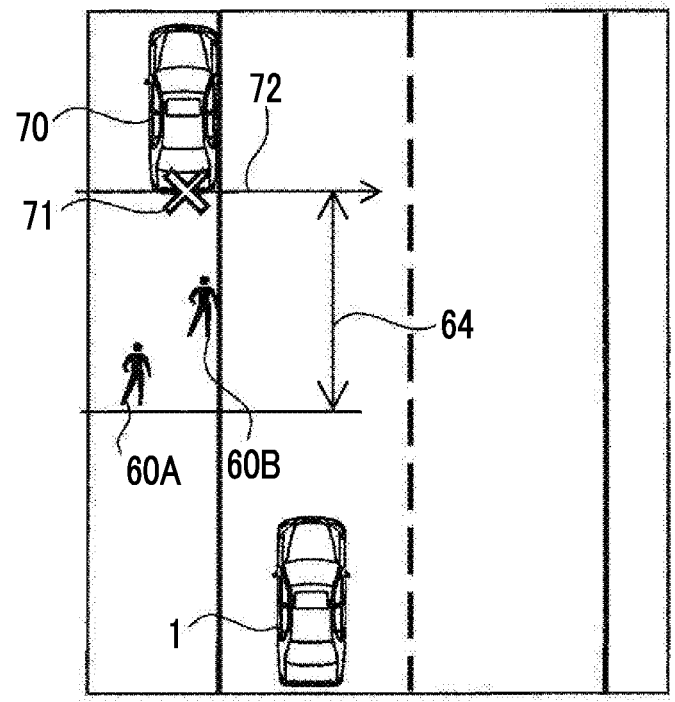
FIG. 18 is a diagram illustrating a first selection criterion of an object having priority as a collision avoidance target.

In FIG. 18, a threshold range 64 of a risk-determination TTC is illustrated along with a stopped vehicle 70 and two pedestrians 60A and 60B. In the example illustrated in FIG. 18, TTCs of both the pedestrians 60A and 60B with respect to the stopped vehicle 70 are in the threshold range 64. Accordingly, when both the risk-determination lateral position and the risk-determination lateral collision position are in the threshold ranges thereof, both the pedestrians 60A and 60B are determined to be objects with a high risk.

However, in the example illustrated in FIG. 18, an object with a higher risk for the host vehicle 1 can be determined to be the pedestrian 60A of which the TTC with respect to the host vehicle 1, that is, the time until the object is level with the host vehicle 1 in the vehicle traveling direction, is shorter. Alternatively, such an object can be determined to be the pedestrian 60A of which a distance to the host vehicle 1 in the vehicle traveling direction is shorter.

In this embodiment, a first selection criterion that a risk of an object of which the TTC with respect to the host vehicle 1 is shorter (or an object of which the distance to the host vehicle 1 in the vehicle traveling direction is shorter) is determined to be higher than that of the other object is provided. In the example illustrated in FIG. 18, the pedestrian 60A is determined to be an object with a higher risk than the pedestrian 60B. A target area in which driving support operates is enlarged for only the pedestrian 60A, and a normal target area is set for the pedestrian 60B. That is, in the example illustrated in FIG. 18, the pedestrian 60A of which the TTC with respect to the host vehicle 1 is shorter is preferentially determined to be a collision-avoidance target.

Figure 19:
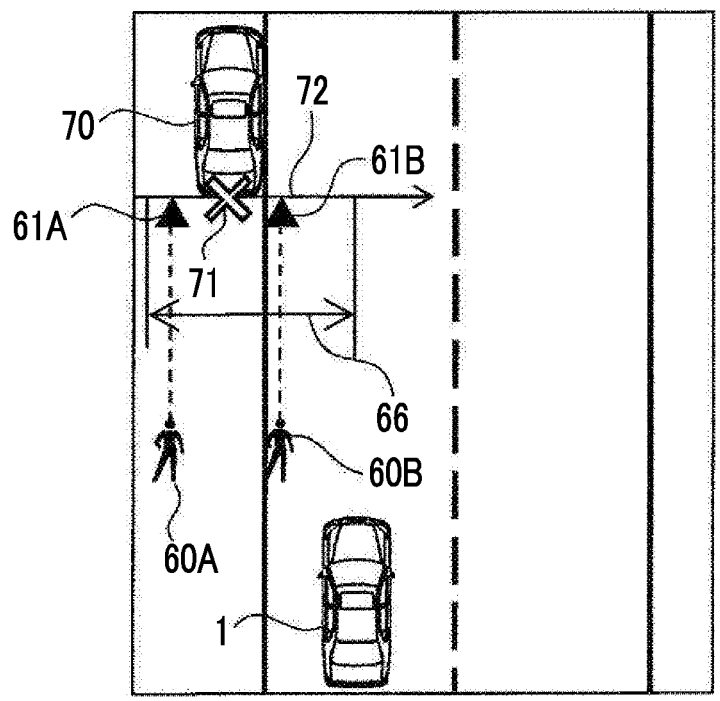
FIG. 19 is a diagram illustrating a second selection criterion of an object having priority as a collision avoidance target.

In FIG. 19, risk-determination lateral positions 61A and 61B of two pedestrians 60A and 60B and a threshold range 66 thereof are illustrated along with a stopped vehicle 70 and two pedestrians 60A and 60B. In the example illustrated in FIG. 19, the risk-determination lateral positions 61A and 61B of the pedestrians 60A and 60B are in the threshold range 66. Accordingly, when both the risk-determination TTCs and the risk-determination lateral collision positions are in the threshold ranges thereof, both the pedestrians 60A and 60B are determined to be objects with a high risk.

However, in the example illustrated in FIG. 19, an object with a higher risk for the host vehicle 1 can be determined to be the pedestrian 60B of which the position in the width direction of the host vehicle 1 is closer to the host vehicle 1. The positions of the pedestrians 60A and 60B in the width direction relative to the host vehicle 1 are acquired by mapping the risk-determination lateral positions 61A and 61B from the stationary object coordinate system to the host vehicle coordinate system.

In this embodiment, a second selection criterion that a risk of an object of which the position in the width direction of the host vehicle 1 is closer to the host vehicle 1 is determined to be higher than that of the other object is provided. In the example illustrated in FIG. 19, the pedestrian 60B is determined to be an object with a higher risk than the pedestrian 60A. A target area in which driving support operates is enlarged for only the pedestrian 60B, and a normal target area is set for the pedestrian 60A. That is, in the example illustrated in FIG. 19, the pedestrian 60B of which the position in the width direction of the host vehicle 1 is closer to the host vehicle 1 is preferentially determined to be a collision-avoidance target.

Figure 20:
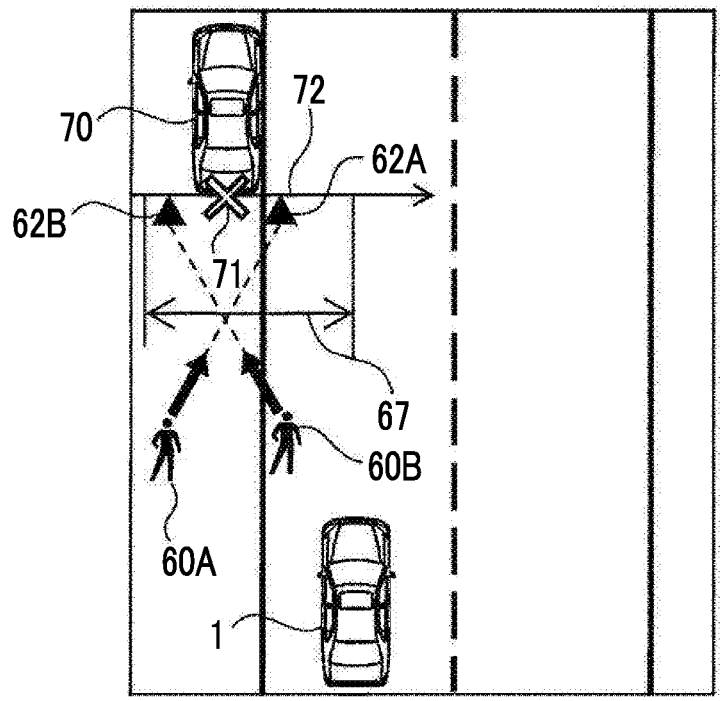
FIG. 20 is a diagram illustrating a third selection criterion of an object having priority as a collision avoidance target.

In FIG. 20, risk-determination lateral collision positions 62A and 62B of two pedestrians 60A and 60B and a threshold range 67 thereof are illustrated along with a stopped vehicle 70 and two pedestrians 60A and 60B. In the example illustrated in FIG. 20, the risk-determination lateral collision positions 62A and 62B of both the pedestrians 60A and 60B are in the threshold range 67. Accordingly, when both the risk-determination TTCs and the risk-determination lateral positions are in the threshold ranges thereof, both the pedestrians 60A and 60B are determined to be objects with a high risk.

However, in the example illustrated in FIG. 20, an object with a higher risk for the host vehicle 1 can be determined to be the pedestrian 60A of which the position in the road width direction when the object is level with the stopped vehicle 70 in the vehicle traveling direction, that is, the risk-determination lateral collision position, is closer to the host vehicle 1. The positions of the risk-determination lateral collision positions 62A and 62B relative to the host vehicle 1 are acquired by mapping the risk-determination lateral collision positions 62A and 62B from the stationary object coordinate system to the host vehicle coordinate system.

In this embodiment, a third selection criterion that a risk of an object of which the position in the road width direction until the object is level with the stopped vehicle 70 in the vehicle traveling direction is closer to the host vehicle 1 is determined to be higher than that of the other object is provided. In the example illustrated in FIG. 20, the pedestrian 60A is determined to be an object with a higher risk than the pedestrian 60B. A target area in which driving support operates is enlarged for only the pedestrian 60A, and a normal target area is set for the pedestrian 60B. That is, in the example illustrated in FIG. 20, the pedestrian 60A of which the position in the road width direction when the pedestrian is level with the stopped vehicle 70 in the vehicle traveling direction is closer to the host vehicle 1 is preferentially determined to be a collision-avoidance target.

Figure 21:
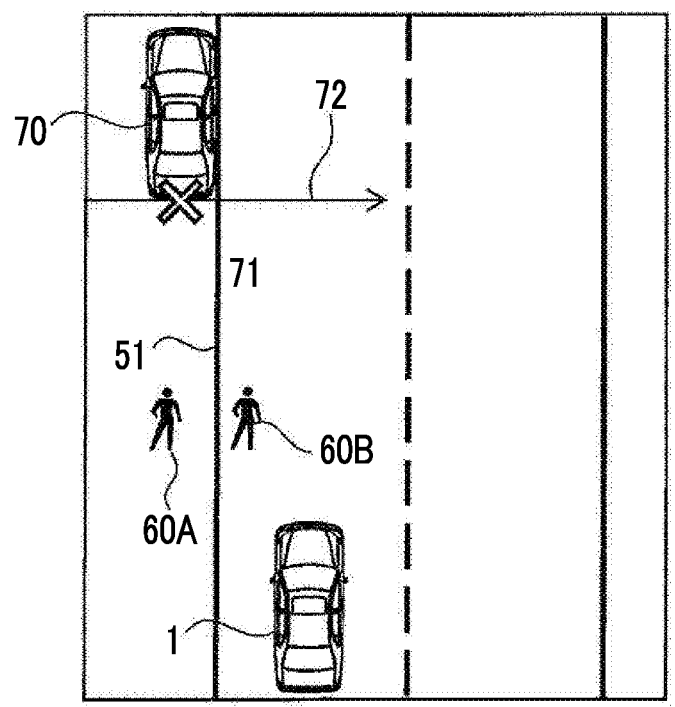
FIG. 21 is a diagram illustrating a fourth selection criterion of an object having priority as a collision avoidance target.

In FIG. 21, a road edge line 51 is illustrated along with a stopped vehicle 70 and two pedestrians 60A and 60B. In the example illustrated in FIG. 21, it is assumed that the risk parameters of the two pedestrians 60A and 60B are in a threshold range for determination of a risk. Both pedestrians are different in that the pedestrian 60A is located outside the road edge line 51 and the pedestrian 60B is located inside the road edge line 51. In this case, an object with a higher risk for the host vehicle 1 can be determined to be the pedestrian 60B who is located inside the road edge line 51.

In this embodiment, a fourth selection criterion that a risk of an object which is located inside the road edge line 51 is determined to be higher than that of an object which is located outside the road edge line 51 is provided. In the example illustrated in FIG. 21, the pedestrian 60B is determined to be an object with a higher risk than the pedestrian 60A. A target area in which driving support operates is enlarged for only the pedestrian 60B, and a normal target area is set for the pedestrian 60A. That is, in the example illustrated in FIG. 21, the pedestrian 60B who is located inside the road edge line 51 is preferentially determined to be a collision-avoidance target.

4-2. Driving Support Control for Collision Avoidance

Figure 22:
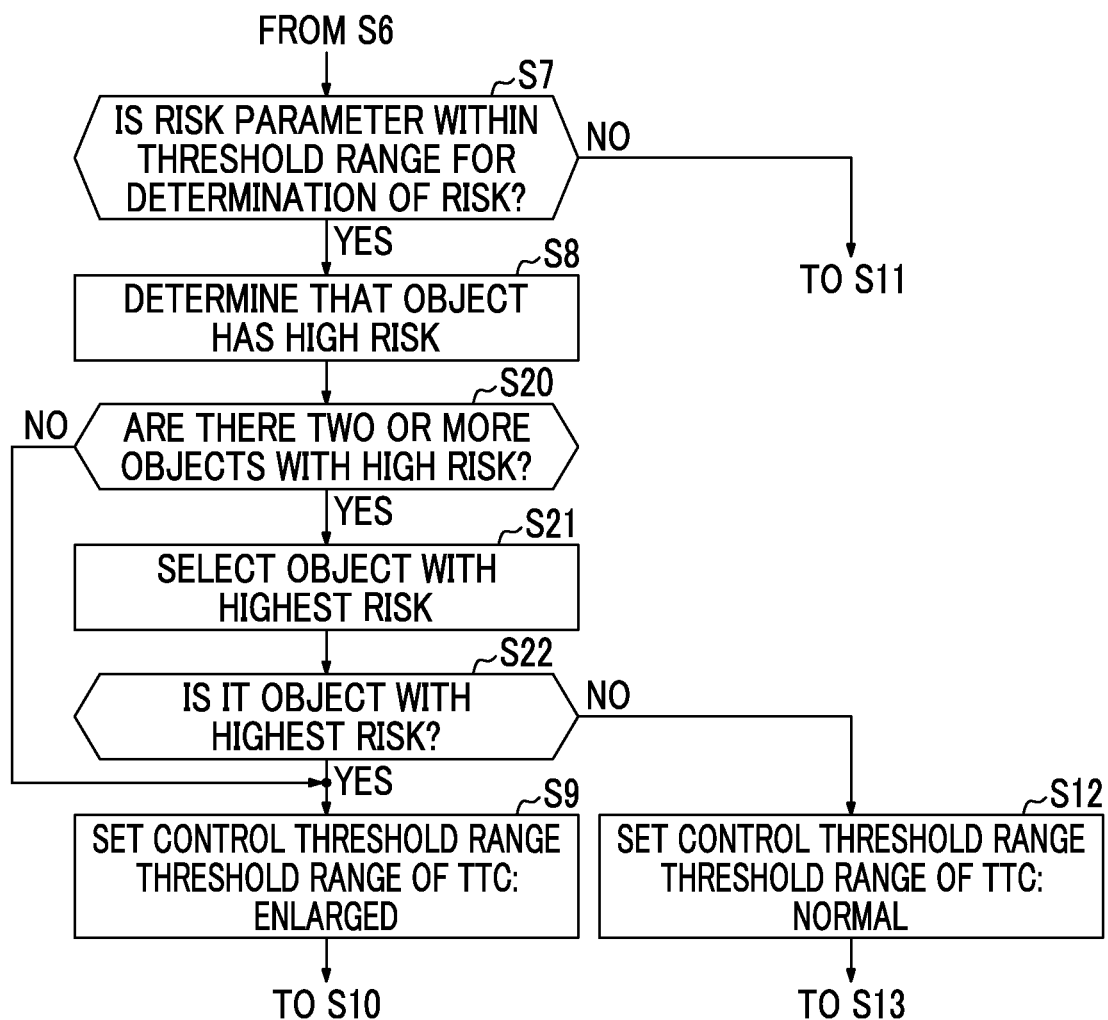
FIG. 22 is a flowchart illustrating a principal part of a flow of driving support control for collision avoidance according to a fourth embodiment.

FIG. 22 is a flowchart illustrating a principal part of a flow of driving support control for collision avoidance according to this embodiment. The same processes as in driving support control according to the first embodiment will be referred to by the same step numbers in the flowchart.

In this embodiment, the processes of Steps S20, S21, and S22 are further performed on an object which is labeled as an object with a high risk in Step S8. In Step S20, it is determined whether the number of objects which are labeled as an object with a high risk in Step S8 is two or more. When there is only one object with a high risk, Steps S21 and S22 are skipped and the process of Step S9 is performed.

When there are two or more objects with a high risk, the process of Step S21 is performed. In Step S21, one object with a highest risk is selected in accordance with a predetermined selection criterion. Only one of four selection criteria illustrated in FIGS. 18 to 21 may be employed or a plurality of selection criteria thereof may be combined. One method using a combination of a plurality of selection criteria is a method of giving priorities to the selection criteria in advance and selecting an object with a highest risk in accordance with the selection criterion with the highest priority. For example, the road edge line (FIG. 21), the position in the width direction relative to the host vehicle (FIG. 19), the TTC with respect to the host vehicle (FIG. 18), and the position in the road width direction when the object is level with the stopped vehicle in the vehicle traveling direction (FIG. 20) are selected in the descending order of priorities. Another method using a combination of a plurality of selection criteria is a method of weighting the selection criteria by cases and selecting an object with a largest sum of weights as an object with a highest risk.

In Step S22, it is determined whether each object which is labeled as an object with a high risk in Step S8 is an object with a highest risk. When the object has a highest risk, the process of Step S9 is selected and the control threshold ranges are set so that an enlarged target area is set for the object. On the other hand, when the object does not have a highest risk, the process of Step S12 is selected and the control threshold ranges are set so that a normal target area is set for the object.

Other Embodiments

In the above-mentioned embodiments, determination of a risk that a moving object will enter the course of the host vehicle to avoid a stationary object when the stationary object and the moving object are present in front of the host vehicle has been described. However, such a risk may also occur when a moving object with a relatively high speed enters the course of the host vehicle to pass by another moving object with a relatively low speed. Calculation of risk parameters in this case is performed as follows.

Figure 23:
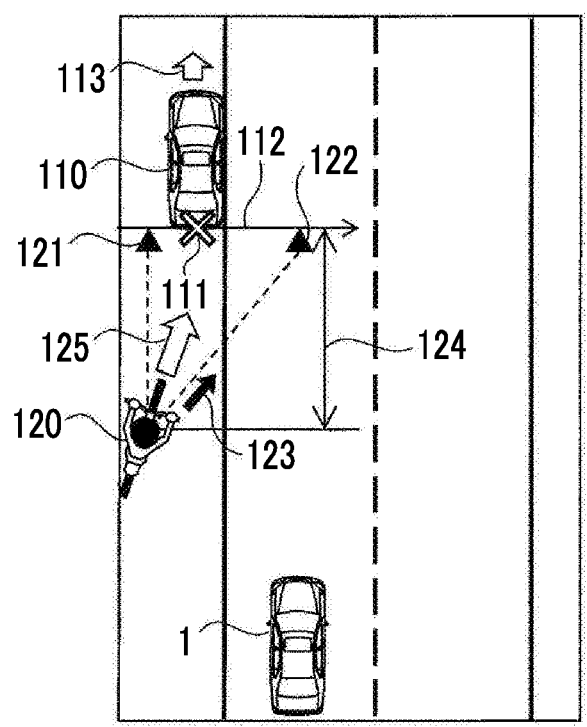
FIG. 23 is a diagram illustrating a risk parameter in a modified example.

In FIG. 23, a host vehicle 1, a slow-moving vehicle 110 which is a low-speed moving object, and a bicycle 120 which is a high-speed moving object are illustrated. A low speed and a high speed which are mentioned therein refer to relative speeds between objects, and both speeds are low when viewed from the host vehicle 1. In this case, the risk parameters for determining a level of a risk that the bicycle 120 will enter the course of the host vehicle 1 is calculated based on the relative relationship between the slow-moving vehicle 110 and the bicycle 120. The risk parameters include a risk-determination lateral position 121, a risk-determination lateral collision position 122, and a risk-determination TTC 124.

The risk-determination lateral position 121 is a position in the road width direction of the bicycle 120 relative to the slow-moving vehicle 110 in a slow-moving vehicle coordinate system centered on a reference point 111 set on the slow-moving vehicle 110, that is, an X coordinate of the bicycle 120 in the slow-moving vehicle coordinate system. The risk-determination lateral collision position 122 is a position in the road width direction when the bicycle 120 is level with the slow-moving vehicle 110 in the vehicle traveling direction, that is, an X coordinate of the bicycle 120 when the bicycle 120 moves to the X axis 112 in the slow-moving vehicle coordinate system in the future. A relative movement vector 123 acquired from a difference between a movement vector 125 of the bicycle 120 and a movement vector 113 of the slow-moving vehicle 110 is used to calculate the risk-determination lateral collision position 122. The risk-determination TTC 124 is a time until the bicycle 120 is level with the slow-moving vehicle 110 in the vehicle traveling direction.

By setting threshold ranges for the risk parameters and determining whether each risk parameter is in the corresponding threshold range, it is possible to determine whether a risk that the bicycle 120 will enter the course of the host vehicle 1 is high or low.

In the above-mentioned embodiments, driving support control for collision avoidance is configured as control which is different from the PCS in the related art. However, driving support control for collision avoidance may be configured as a part of the PCS.

Driving support may include at least one of support of deceleration of the host vehicle by a driver and support of avoidance steering of the host vehicle by the driver. Examples of the moving object include a pedestrian, a bicycle, and an automobile. Examples of the stationary object include a stopped vehicle stopping on a road shoulder or a sidewalk.

What is claimed is:

1. A vehicle control system comprising
an electronic control unit configured to:
recognize at least one object in front of a host vehicle using a sensor;
determine a risk of the at least one object entering a course of the host vehicle; and
perform, when the at least one object enters a target area set in front of the host vehicle with respect to the host vehicle, driving support for decreasing a likelihood of collision of the host vehicle with the at least one object,
wherein the electronic control unit is configured to:
determine whether the risk is high or low based on a relative relationship between two or more objects when the at least one object includes the two or more objects, and
set the target area to be larger when it is determined that the risk is high than when it is determined that the risk is low,
determine whether the risk is high or low for a moving object with respect to a stationary object when the at least one object includes the moving object and the stationary object,
acquire a comparison result by performing at least one of (i) comparison between a current position of the moving object in a road width direction relative to the stationary object and a first threshold range, (ii) comparison between a future position of the moving object in the road with direction when the moving object is level with the stationary object in a vehicle traveling direction of the host vehicle and a second threshold range, (iii) comparison between a time until the moving object is level with the stationary object in the vehicle traveling direction and a third threshold range, and (iv) comparison between a distance of the moving object from the stationary object in the vehicle traveling direction and a fourth threshold range; and
determine whether the risk is high or low based on the comparison result.

2. The vehicle control system according to claim 1, wherein the electronic control unit is configured to enlarge the target area, in at least a width direction of the host vehicle, to be larger when it is determined that the risk is high than when it is determined that the risk is low.

3. The vehicle control system according to claim 1, wherein the electronic control unit is configured to set a control value for the driving support to be larger when it is determined that the risk is high than when it is determined that the risk is low.

4. The vehicle control system according to claim 1, wherein the electronic control unit is configured to determine the risk only when the at least one object includes at least one moving object.

5. The vehicle control system according to claim 4, wherein the electronic control unit is configured to determine the risk only for the at least one moving object.

6. The vehicle control system according to claim 1, wherein the electronic control unit is configured to set the first threshold range to be on the same side as the host vehicle with respect to the stationary object.

7. The vehicle control system according to claim 1, wherein the electronic control unit is configured to set the second threshold range to be on the same side as the host vehicle with respect to the stationary object.

8. The vehicle control system according to claim 1, wherein the electronic control unit is configured to determine that, when there are a plurality of moving objects for which the risk is determined to be high based on the comparison result, a first risk for a first moving object is higher than a second risk for a second moving object, in a case where the first moving object is located closer to the host vehicle compared with the second moving object in a width direction of the host vehicle, the plurality of the moving objects including the first moving object and the second moving object.

9. The vehicle control system according to claim 1, wherein the electronic control unit is configured to determine that, when there are a plurality of moving objects for which the risk is determined to be high based on the comparison result, a first risk for a first moving object is higher than a second risk for a second moving object, in a case where a first future position of the first moving object in the road width direction when the first moving object is level with the stationary object in the vehicle traveling direction is closer to the host vehicle compared with a second future position of the second moving object in the road width direction when the second moving object is level with the stationary object in the vehicle traveling direction, the plurality of the moving objects including the first moving object and the second moving object.

10. The vehicle control system according to claim 1, wherein the electronic control unit is configured to determine that, when there are a plurality of moving objects for which the risk is determined to be high based on the comparison result, a first risk for a first moving object is higher than a second risk for a second moving object, in a case where a first time until the first moving object is level with the host vehicle in the vehicle traveling direction is shorter than a second time until the second moving object is level with the host vehicle in the vehicle traveling direction, the plurality of the moving objects including the first moving object and the second moving object.

11. The vehicle control system according to claim 1, wherein the electronic control unit is configured to determine that, when there are a plurality of moving objects for which the risk is determined to be high based on the comparison result, a first risk for a first moving object is higher than a second risk for a second moving object, in a case where a first distance between the first moving object and the host vehicle in the vehicle traveling direction is smaller than a second distance between the second moving object and the host vehicle in the vehicle traveling direction, the plurality of the moving objects including the first moving object and the second moving object.

12. The vehicle control system according to claim 1, wherein the electronic control unit is configured to determine that, when there are a plurality of moving objects for which the risk is determined to be high based on the comparison result, a first risk for a first moving object, the first moving object being located inside a road edge line, is higher than a second risk for a second moving object, the second moving object being located outside the road edge line, the plurality of the moving objects including the first moving object and the second moving object.

13. The vehicle control system according to claim 1, wherein the electronic control unit is configured to enlarge the target area, in a vehicle traveling direction, to be larger when it is determined that the risk is high than when it is determined that the risk is low.

* * * * *